United States Patent
Kundu et al.

(10) Patent No.: US 11,546,503 B1
(45) Date of Patent: Jan. 3, 2023

(54) DYNAMIC IMAGE COMPRESSION FOR MULTIPLE CAMERAS OF AUTONOMOUS VEHICLES

(71) Applicant: Hitachi Astemo, Ltd., Ibaraki (JP)

(72) Inventors: Subrata Kumar Kundu, Canton, MI (US); Xunfei Zhou, Farmington Hills, MI (US); Naveen Kumar Bangalore Ramaiah, Farmington Hills, MI (US); Lars Watts, Southfield, MI (US); Kota Irie, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/495,641

(22) Filed: Oct. 6, 2021

(51) Int. Cl.
*H04N 5/232* (2006.01)
*H04N 7/18* (2006.01)
*G06V 20/56* (2022.01)

(52) U.S. Cl.
CPC ......... *H04N 5/23218* (2018.08); *G06V 20/56* (2022.01); *H04N 5/23203* (2013.01); *H04N 5/23225* (2013.01); *H04N 7/18* (2013.01)

(58) Field of Classification Search
CPC ........... H04N 5/23218; H04N 5/23203; H04N 5/23225; H04N 7/18; H04N 19/42; H04N 19/44; H04N 19/436; H04N 19/127; H04N 19/156; G06V 20/56; G06F 9/5044; G06F 9/505; G06F 9/5055
See application file for complete search history.

(56) References Cited

U.S. PATENT DOCUMENTS

| | | | |
|---|---|---|---|
| 6,891,973 B1 | 5/2005 | Atsumi et al. | |
| 10,994,655 B2* | 5/2021 | Tatara | H04N 7/181 |
| 11,112,791 B2* | 9/2021 | Bhanushali | H04N 19/167 |
| 2011/0267452 A1 | 11/2011 | Notsu et al. | |
| 2016/0059781 A1* | 3/2016 | Tatara | H04N 7/181 348/148 |
| 2016/0283804 A1 | 9/2016 | Furman et al. | |
| 2020/0348665 A1* | 11/2020 | Bhanushali | H04N 19/167 |
| 2021/0321123 A1* | 10/2021 | Strandby | H04N 19/42 |
| 2022/0065644 A1* | 3/2022 | Kundu | G01C 21/3446 |

* cited by examiner

*Primary Examiner* — Boubacar Abdou Tchoussou
(74) *Attorney, Agent, or Firm* — Procopio, Cory, Hargreaves & Savitch LLP

(57) ABSTRACT

A system for dynamic image compression in autonomous vehicles with multiple cameras. The cameras of a vehicle may be prioritized based on various features, and different image compression techniques may be assigned to different cameras in the vehicle, based on the priorities of the cameras, to reduce overall processing load of the vehicle.

19 Claims, 23 Drawing Sheets

FIG. 7

| Category | Feature |
|---|---|
| Road Type | Highway |
| | Urban |
| Direction | Straight |
| | Right Turn |
| | Left Turn |
| Lane Information | Total Number of Lanes |
| | Lane Number |
| | Localization |
| | Lane Width |
| Weather | Sunny |
| | Cloudy |
| | Rainy |
| | Foggy |
| Time | Day |
| | Night |
| Target Recognition | Obstacle |
| | Lane |
| | Road Feature |
| | Traffic Sign |
| | Traffic Light |
| | Anomaly |
| | Pedestrian |
| | Animal |
| Speed | Current |
| | Future |
| AD-ECU | Load/Usage |
| | Power |
| ... | ... |

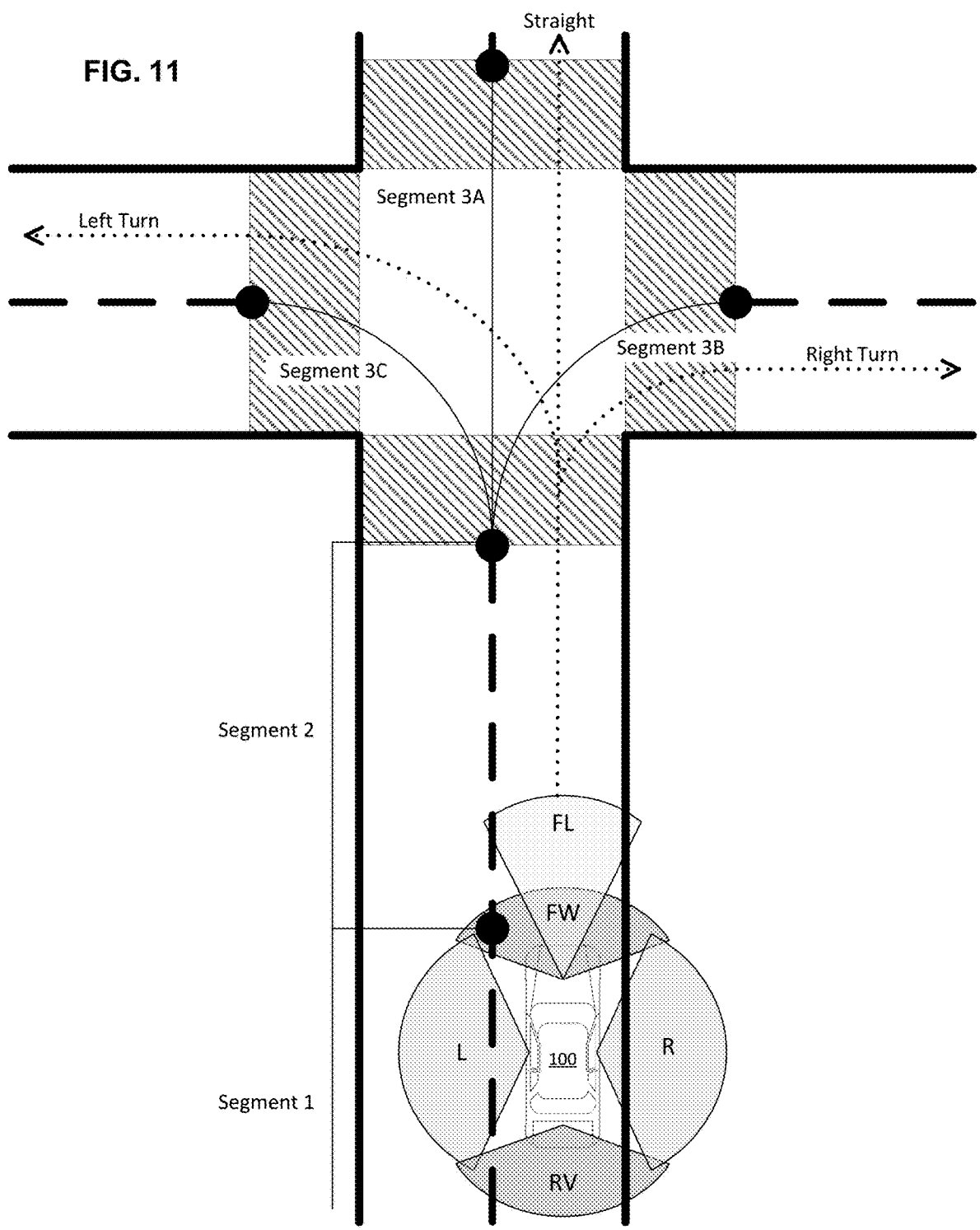

DYNAMIC IMAGE COMPRESSION FOR MULTIPLE CAMERAS OF AUTONOMOUS VEHICLES

BACKGROUND

Field of the Invention

The embodiments described herein are generally directed to autonomous vehicles, and, more particularly, to dynamic image compression for multiple cameras of an autonomous vehicle.

Description of the Related Art

An autonomous vehicle, sometimes referred to as a self-driving car or connected autonomous vehicle (CAV), can be defined as a vehicle that is capable of sensing its environment and moving safely within its environment with little or no human input. Typically, to ensure that an autonomous vehicle can make decisions with minimal or no human intervention, a wide range of sensors are placed around the vehicle, pointing in all directions, to ensure full environmental awareness. To achieve proactive and safe motion planning and control of the autonomous vehicle, the sensors are designed to probe objects within distances up to hundreds of meters.

There is a long-running debate, among the major players in autonomous driving (AD) technology, about the most suitable sensor architecture for future AD vehicles. A majority of these players believe that Light Detection And Ranging (LiDAR) sensors are an essential part of a sensor architecture, while others are interested in a pure end-to-end machine-learning approach that uses just cameras and radar. LiDAR works by using an array of lasers to build a point cloud, representing objects. The speeds and distances of the objects are measured by calculating the movements of the objects between frames. However, LiDAR is so expensive as to be cost-prohibitive in many cases.

An array of cameras can achieve the same performance as LiDAR. However, in order to do so, the cameras must be able to cover hundreds of meters of distance. In other words, the cameras must capture very high-resolution images (e.g., three to eight megapixels). The usage of such high-resolution images vastly increases the data-processing load on a vehicle's Electronic Control Unit (ECU), thereby diminishing processing speed and potentially pushing the ECU beyond its computational capacity. This can be dangerous, since autonomous driving requires the vehicle to respond to quickly changing events over very short periods of time (e.g., tenths of a second).

Image compression techniques (ICTs) can be used to reduce the amount of data transferred or processed per unit time. The goal of image compression can be summarized as minimizing the size in bytes of an image file without degrading the quality of the image to an unacceptable level (e.g., a level without sufficient information to reliably perform a desired function). While image compression is useful for efficient data management, some image compression techniques result in the loss of information. In particular, there is a trade-off between the compression ratio, performance metrics (e.g., processing speed), and information loss. Image compression techniques with less information loss tend to result in lower compression ratios and longer processing times, whereas image compression techniques with shorter processing times and higher compression ratios tend to result in more information loss.

While the prior art discusses image compression techniques generally, it does not offer a solution for addressing the volume of data output by an array of high-resolution cameras in the context of limited resources.

SUMMARY

Accordingly, systems and methods are disclosed that can dynamically adjust and vary the image compression techniques (ICT) used to compress images, captured by an array of cameras in a vehicle, on a per-camera basis, to reduce the load on the vehicle's ECU and/or other computational resources while maintaining satisfactory performance. For example, image compression techniques may be adjusted to decrease compression (i.e., reduce information loss, while increasing processing load) in regions around the vehicle that are of relatively high priority (e.g., due to a high potential for obstacles or relevant information), while increasing compression (i.e., increasing information loss, while decreasing processing load) in regions around the vehicle that are of relatively low priority (e.g., due to a low potential for obstacles or relevant information). In other words, an appropriate balance is maintained between processing time and information loss, to ensure satisfactory performance.

In embodiments, a system for dynamically assigning image compression techniques to a plurality of cameras in a vehicle is disclosed, wherein the system comprises at least one hardware processor that: receives a plurality of features, wherein each of the plurality of features is a feature of the vehicle or a feature of an environment of the vehicle; prioritizes each of the cameras within the plurality of cameras based on the plurality of features; and assigns one of a plurality of available image compression techniques to each of the plurality of cameras based on the prioritizations, such that an image compression technique assigned to a camera with higher priority has less information loss than an image compression technique that is assigned to a camera with lower priority.

The at least one hardware processor may be located in a cloud system, wherein the plurality of features are received from the vehicle over at least one network, and wherein the at least one hardware processor further sends, to the vehicle over the at least one network, the assignments of the plurality of available image compression techniques to the plurality of cameras.

The at least one hardware processor may be located in the vehicle, and the at least one hardware processor may further compress images from each of the plurality of cameras, based on the one of the plurality of available image compression techniques assigned to that camera, prior to object recognition being performed on the images.

The at least one hardware processor may be located in an electronic control unit (ECU) of the vehicle. The at least one hardware processor may further apply an object-recognition model to the compressed images to recognize objects in the images.

The plurality of features may comprise a direction of travel of the vehicle, and prioritizing each of the cameras may comprise increasing a priority of one or more of the plurality of cameras that have a field of view in the direction of travel, relative to a priority of one or more of the plurality of cameras that do not have a field of view in the direction of travel.

In an implementation designed for right-side driving, the plurality of cameras may comprise a front-facing camera, a right-facing camera, a left-facing camera, and a rear-facing camera, and prioritizing each of the cameras may comprise, when the direction of travel is straight, prioritizing the front-facing camera and the right-facing camera over the left-facing camera and the rear-facing camera.

In an implementation designed for left-side driving, the plurality of cameras may comprise a front-facing camera, a right-facing camera, a left-facing camera, and a rear-facing camera, and prioritizing each of the cameras may comprise, when the direction of travel is straight, prioritizing the front-facing camera and the left-facing camera over the right-facing camera and the rear-facing camera.

The plurality of features may comprise a detected object of interest, and prioritizing each of the cameras may comprise increasing a priority of one or more of the plurality of cameras that have a field of view of the detected object of interest, relative to a priority of one or more of the plurality of cameras that do not have a field of view of the detected object of interest.

The plurality of features may comprise detected objects of a plurality of prioritized classes, and prioritizing each of the cameras may comprise, when a first object of a first class of the plurality of prioritized classes is detected in an image from a first camera of the plurality of cameras while a second object of a second class of the plurality of prioritized classes is detected in an image from a second camera of the plurality of cameras and the second class is prioritized over the first class, increasing a priority of the second camera relative to the first camera.

The plurality of features may comprise a road type, wherein the plurality of cameras comprise a forward long camera and a forward wide camera, and wherein the forward long camera has a longer and narrower field of view than the forward wide camera, and prioritizing each of the cameras may comprise: when the road type is a first road type from a plurality of possible road types, prioritizing the forward long camera over the forward wide camera; and, when the road type is a second road type from the plurality of possible road types, prioritizing the forward wide camera over the forward long camera.

The plurality of features may comprise computational loads on processor cores that process images from each of the plurality of cameras, and prioritizing each of the cameras may comprise decreasing a prioritization of a camera whose images are being processed by a processor core with a computational load that exceeds a threshold.

The plurality of features may comprise route information, and receiving the plurality of features may comprise: determining a current location of the vehicle; determining a route segment corresponding to the current location of the vehicle; and retrieving the route information associated with the route segment.

The at least one hardware processor may further determine a field of view for each of the plurality of cameras based on one or more of the plurality of features.

The at least one hardware processor may further assign one of a plurality of available object-recognition models to each of the plurality of cameras based on the prioritizations. The plurality of available object-recognition models may comprise a plurality of types of one or both of deep neural networks or rule-based algorithms. The plurality of available object-recognition models may comprise a first object-recognition model and a second object-recognition model, wherein the first object-recognition model has greater accuracy than the second object-recognition model, and wherein the first object-recognition model requires greater computational resources than the second object-recognition model.

The prioritization may comprise at least three levels of priority.

The plurality of available image compression techniques may comprise at least one lossless image compression technique and two or more lossy image compression techniques.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 7 illustrates an example lookup table that may be used to select image compression techniques for an array of cameras, according to an example implementation;

FIG. 11 illustrates an example scenario for illustrating dynamic image compression, according to an example implementation;

DETAILED DESCRIPTION

Embodiments of dynamic image compression for multiple cameras in an autonomous vehicle are disclosed in the present application. After reading this description, it will become apparent to one skilled in the art how to implement the dynamic image compression in various alternative embodiments and alternative applications. However, although various embodiments and applications will be described herein, it is understood that these embodiments and applications are presented by way of example and illustration only, and not limitation. As such, this detailed description should not be construed to limit the scope or breadth of the present invention as set forth in the appended claims. In addition, example features and functions described herein can be utilized, in various embodiments, either singularly or in combination with other features and functions, and may be implemented through any means that are presently known or which arise in the future. Furthermore, while processes, described herein, may be illustrated with a certain arrangement and ordering of subprocesses, each process may be implemented with fewer, more, or different subprocesses and a different arrangement and/or ordering of subprocesses. It should also be understood that any subprocess, which does not depend on the completion of another subprocess, may be executed before, after, or in parallel with that other independent subprocess, even if the subprocesses are described or illustrated in a particular order.

Figure 1:
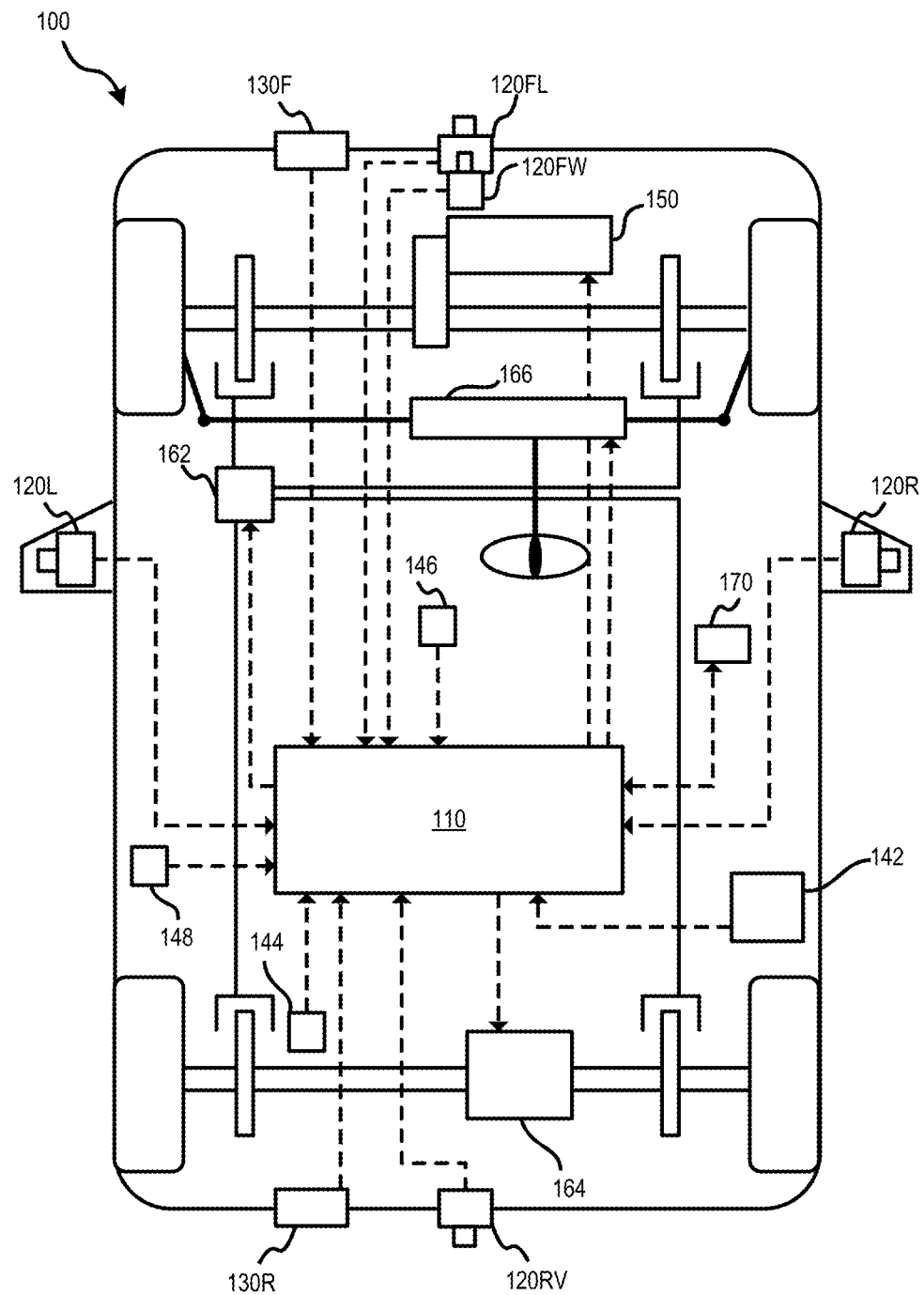
FIG. 1 illustrates an example vehicle, according to an example implementation.

FIG. 1 illustrates an example vehicle 100, according to an example implementation. The illustrated vehicle 100 may be configured to operate in both a human-operated mode and an AD mode. The AD mode may be semi-autonomous or fully autonomous. In particular, vehicle 100 may be configured to operate at any one, or any combination of two or more, levels of autonomy, as defined by the Society of Automotive Engineers (SAE), including Level 1 (driver only), Level 2 (assisted driving), Level 3 (partially automated), Level 4 (highly automated), and/or Level 5 (fully automated). However, it should be understood that the full benefits of disclosed embodiments may only manifest when vehicle 100 is operated with some form of autonomy (i.e., Levels 2 to 5).

Vehicle 100 comprises an ECU 110 that controls a plurality of subsystems of vehicle 100, including subsystems related to autonomous driving, based on data collected from one or more sensing systems. In particular, ECU 110 may receive data signals from one or more subsystems, such as one or more cameras 120, one or more radars 130, and one or more other sensing systems (e.g., 142-148), and send control signals to one or more subsystems, such as engine 150 and one or more other actuation systems (e.g., 162-166). ECU 110 may be an AD ECU or Advanced Driver-Assistance System (ADAS) ECU.

As illustrated, vehicle 100 may comprise an array of a plurality of cameras 120. In the illustrated embodiment, the array of cameras 120 comprises a forward long camera 120FL with a field of view (FOV) from the front of vehicle 100, a forward wide camera 120FW with a wider, but shorter, field of view from the front of vehicle 100 than forward long camera 120FL, a right camera 120R with a field of view from the right of vehicle 100, a left camera 120L with a field of view from the left of vehicle 100, and a rearview camera 120RV with a field of view from the rear of vehicle 100. Each of cameras 120FL, 120FW, 120R, 120L, and 120RV may be monocular cameras, such that the array of cameras 120 comprises five monocular cameras. However, it should be understood that other configurations of cameras 120 are possible. For example, the array of cameras 120 may comprise eight monocular cameras (e.g., a forward long camera, forward wide camera, rearview long camera, rearview wide camera, right long camera, right wide camera, left long camera, and left wide camera), six stereo cameras (e.g., a forward center camera, a forward right camera, a rear right camera, a rear center camera, a rear left camera, and a forward left camera), one fisheye camera (e.g., mounted on the top of vehicle 100), and/or the like. While implementations will primarily be described herein with respect to the illustrated array of five monocular cameras 120, it should be understood that embodiments may be similarly or identically applied to any other configuration of cameras 120.

The field of view of each camera 120 may overlap to some degree with the fields of view of adjacent cameras 120, such that an entire omnidirectional view around vehicle 100 is imaged. In other words, collectively, the array of cameras 120 captures images that preferably represent a panoramic, omnidirectional view around vehicle 100. These images may be used to detect objects, such as lane markers, traffic signs, traffic lights, obstacles (e.g., other vehicles, pedestrians, barriers, road debris, etc.), and/or the like around vehicle 100, and determine the positions and/or speeds of these objects relative to vehicle 100.

In the illustrated example, the sensing systems include a map positioning unit 142, a speed measuring device 144, a vehicle behavior measuring device 146, and an audio sensor 148. However, more, fewer, and/or a different combination of sensing systems may be incorporated into vehicle 100, including any sensor that measures the value of a parameter indicating an operating and/or environmental condition of vehicle 100. Map positioning unit 142 may provide information to ECU 110 about the geographical position of vehicle 100 (e.g., relative to a geographical map), for example, based on coordinates acquired from signals received from a global navigation satellite system (GNSS), such as the Global Positioning System (GPS). The information provided by map positioning unit 142 may comprise a set route (e.g., comprising a start point, destination point, and one or a plurality of waypoints between the start point and the destination point, with each pair of consecutive waypoints representing a route segment), map data (e.g., comprising map elements encompassing the set route), the current position of vehicle 100 within the map represented by the map data, the current direction of travel of vehicle 100, lane information (e.g., number of lanes), the speed limit on the route segment corresponding to the current position of vehicle 100, the type of road corresponding to the current position of vehicle 100 (e.g., rural, urban, highway, branch, toll, parking lot or structure, etc.), and/or the like. Speed measuring device 144 may measure the wheel speed of vehicle 100, and vehicle behavior measuring device 146 may measure longitudinal acceleration, lateral acceleration, and/or yaw rate of vehicle 100. Audio sensor 148 may collect sounds within the environment of vehicle 100, so that the sounds may be processed (e.g., by ECU 110) to detect and respond to warning sounds output by railroad crossings, vehicle horns, emergency vehicles, and/or the like.

In the illustrated embodiment, the actuation systems include a braking system 162, a differential mechanism 164, and a steering system 166. However, it should be understood that more, fewer, and/or a different combination of actuation systems may be incorporated into vehicle 100. Braking system 162 may comprise hydraulic brakes capable of independently controlling braking forces applied to the wheels. For example, braking system 162 may apply braking forces to either the right wheels or the left wheels to apply a yawing moment to vehicle 100 when turning. Differential mechanism 164 may drive an electric motor or clutch to generate a torque difference between the right axle and the left axle of vehicle 100 to apply a yawing moment to vehicle 100 when turning. Steering system 166 may be a steer-by-wire system capable of correcting the steering angle of vehicle 100, independently of the turning angle of the steering wheel, to apply a yawing moment to vehicle 100 when turning.

ECU 110 may communicate with a human-machine interface 170 that manages interactions between the driver and various subsystems of vehicle 100. Human-machine interface 170 may comprise one or a plurality of informational consoles that are capable of displaying text and/or images (e.g., on an instrument panel, touch-panel display monitor, etc.), generating sounds (e.g., via one or more speakers), activating and deactivating warning lights (e.g., representing information about vehicle operation), and/or the like, under the control of ECU 110. ECU 110 may also receive driver operations through human-machine interface 170, including, for example, via the information consoles and/or other hardware components (e.g., buttons, levers, switches, etc.).

One or a plurality, including potentially all, of the actuation systems may be electronically controlled via drive signals output by ECU 110. Thus, ECU 110 may control various actuation systems of vehicle 100 based on inputs from various sensing systems of vehicle 100 that represent vehicular and/or environmental conditions, driver operations, and/or the like. For example, when vehicle 100 needs to accelerate (e.g., in response to depression of the accelerator pedal by the driver, autonomous acceleration in response to a traffic light change, removal of an obstacle, upgrade in road type, increase in speed limit, etc.), ECU 110 may output an acceleration signal to engine 150 to cause engine 150 to increase power. Conversely, when vehicle 100 needs to decelerate (e.g., in response to depression of the brake pedal, autonomous deceleration in response to a traffic light, introduction of an obstacle, downgrade in road type, decrease in speed limit, etc.), ECU 110 may output a deceleration signal to engine 150 to decrease power and/or a braking signal to braking system 162 to apply the brakes. As another example, when the vehicle 100 needs to turn (e.g., as indicated by the driver's activation of a turn signal, based on a directional or lane change required to follow a set route through which vehicle 100 is being autonomously driven, etc.), ECU 110 may output one or more of a deceleration signal to engine 150 to decrease power, a braking signal to braking system 162 to apply the brakes, a signal to differential mechanism 164 to redistribute power to the wheels, and/or a steering signal to steering system 166 to change the direction of vehicle 100.

Figure 2:
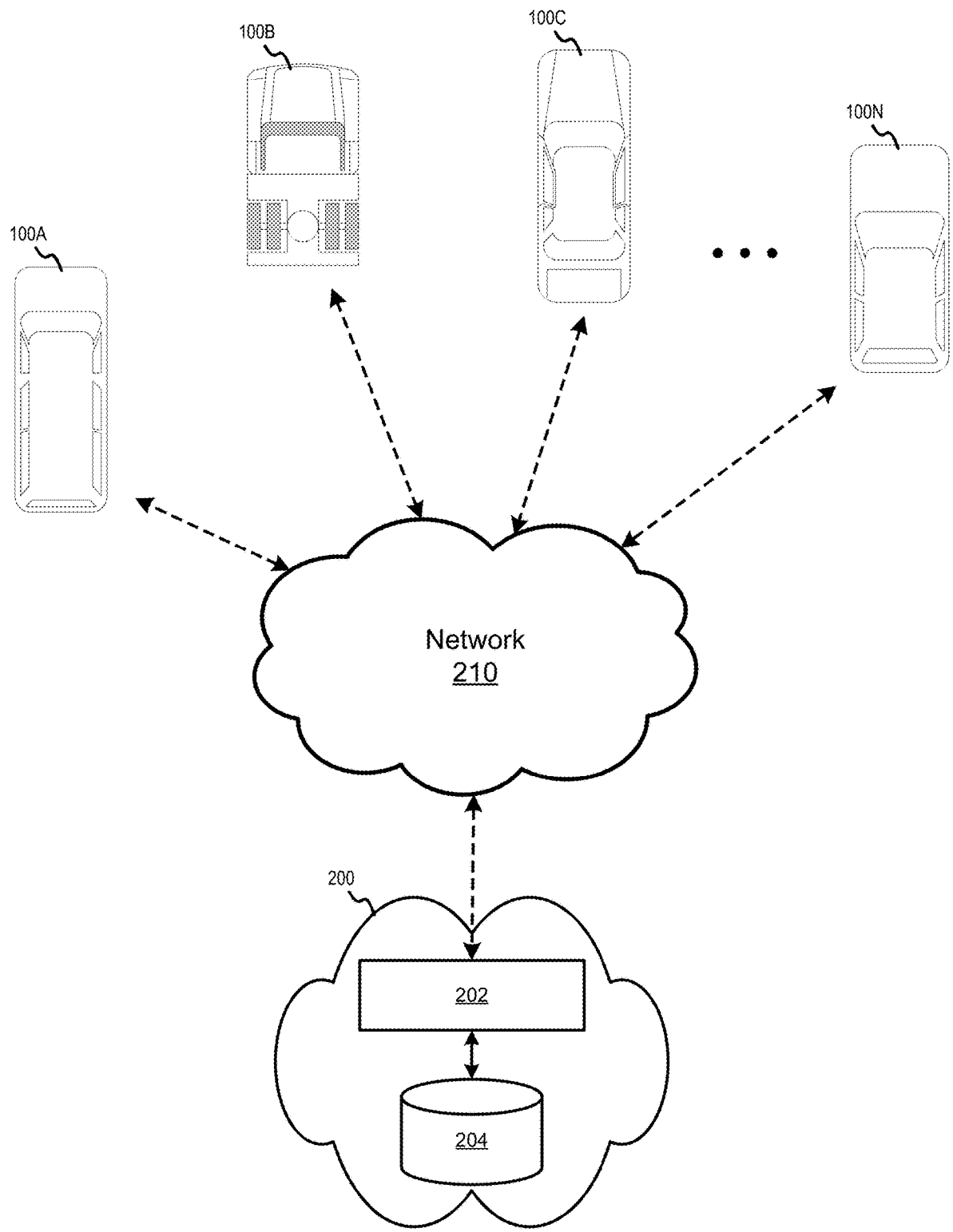
FIG. 2 illustrates an example infrastructure for platform-based management of a plurality of vehicles, according to an example implementation.

FIG. 2 illustrates an example infrastructure for platform-based management of a plurality of vehicles 100, according to an embodiment. In particular, a plurality of vehicles 100 (e.g., vehicle 100A to 100N) may be communicatively connected with a platform 200 via one or more networks 210. ECU 110 in each vehicle 100 may communicate with network 210 using well-known wireless communication means, such as cellular communication protocols. For example, ECU 110 may comprise or control a wireless transceiver with one or more antennas that transmit and receive data from the base stations of a cellular network to communicate with platform 200 via the cellular network and typically one or more other networks (e.g., the Internet). In general, network 210 may comprise any network or combination of networks, including, for example, a cellular network, a satellite network, a local area network (LAN), a wide area network (WAN), Dedicated Short-Range Communications (DSRC), the Internet, and/or the like.

Platform 200 may be a cloud platform that provides on-demand computing power and/or data storage from a pool of shared resources that are distributed across a plurality of hardware servers in one or a plurality of data centers. Platform 200 may execute software 202 and store data, created by software 202 and/or used by software 202, in database 204. It should be understood that software 202 may comprise one or a plurality of distinct software modules, and database 204 may comprise one or a plurality of distinct databases.

Figure 3:
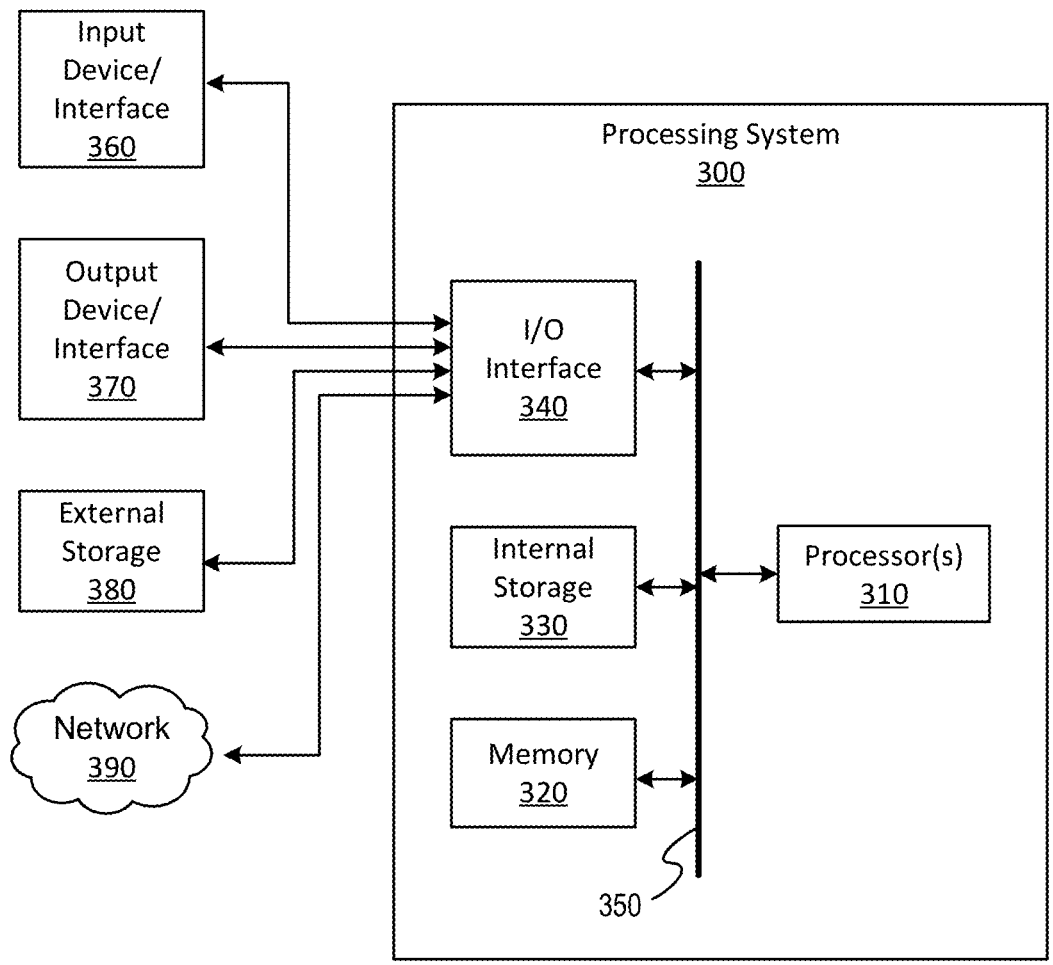
FIG. 3 illustrates an example processing system, by which one or more of the processes described herein, may be executed, according to an example implementation.

FIG. 3 illustrates an example processing system 300 that can be used to implement one or more of the processes described herein, according to an example implementation. For example, processing system 300 may be used as or in ECU 110 to perform one or more functions of ECU 110. Processing system 300 may also be used as or in one or more cameras 120 (e.g., to preprocess signal data, control the camera's configuration, etc.), one or more radars 130 (e.g., to preprocess signal data, control the radar's configuration, etc.), one or more other sensing systems (e.g., 142, 144, 146, 148), one or more actuation systems (e.g., 162, 164, 166), human-machine interface 170, and/or the like. In addition, processing system 300 may be used in platform 200 to execute all or a portion of software 202 and/or manage the storage and retrieval of data to and from database 204. While processing system 300 is illustrated with certain components, it should be understood that processing system 300 may comprise more, fewer, and/or a different combination and/or arrangement of components than illustrated in FIG. 3. For example, one or more of the illustrated components may be omitted from processing system 300.

Processing system 300 may comprise one or more processors 310, memory 320, internal storage 330, an input/output (I/O) interface 340, and/or the like. Any of processor(s) 310, memory 320, internal storage 330, and I/O interface 340 may be communicatively coupled via a communication bus 350 or other communication means. Communication bus 350 may include a data channel for facilitating information transfer between processor 310, memory 320, internal storage 330, I/O interface 340, and/or other components of processing system 300. Furthermore, communication bus 350 may provide a set of signals used for communication with processor 310, including a data bus, address bus, and/or control bus (not shown). Communication bus 350 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

Processor(s) 310 may comprise a central processing unit (a single core or multi-core CPU), as well as one or more additional discrete or integrated processors, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor.

Memory 320 provides storage of instructions and data for software being executed by processor(s) 310. It should be understood that the software in memory 320 may implement one or more functions described herein. The software instructions may be compiled from any suitable programming language, including, without limitation, C, C++, C#, Java, JavaScript, Python, Perl, Visual Basic, and the like. Memory 320 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read-only memory (ROM). Memory 320 may be implemented with one or more caches.

Internal storage 330 may comprise a non-transitory computer-readable medium that provides storage of instructions and data for software. In a particular implementation, memory 320 may be volatile memory that only maintains the software while processing system 300 is supplied with power. In contrast, internal storage 330 may be non-volatile memory that maintains the software even when processing system 300 is not powered, but which provides slower access times than memory 320. It should be understood that memory 320 is generally implemented with significantly less capacity than internal storage 330. Thus, software may be persistently stored in internal storage 330, while portions of the software that are to be executed by processor(s) 320 are copied temporarily to memory 320 for execution. Internal storage 330 may comprise, for example, a hard drive, a solid state drive (SSD) (e.g., flash memory), and/or the like.

I/O interface 340 may be configured to communicate with an input device or input device interface 360 to receive data as inputs and/or an output device or output device interface 370 to send data as outputs. Typical input devices include cameras 120, sensing systems (e.g., 142, 144, 146, and/or 148), touch-screens or other touch-sensitive devices (e.g., in human-machine interface 170), buttons, keyboards, keypads, computer mice, microphones, and/or the like. Typical output devices include engine 150, actuation systems (e.g., 162, 164, and/or 166), display monitors, speakers, haptic motors, and/or the like. In addition, I/O interface 340 may be configured to communicate with an external storage 380 to store and/or retrieve data (e.g., software comprising instructions and/or data). I/O interface 340 may also comprise a network interface that communicates with a network 390. Network 390 may comprise or be coextensive with network 210 or may comprise an internal network, such as a private network of platform 200 or a Controller Area Network (CAN) within vehicle 100, depending on how processing system 300 is being used. Communication between I/O interface 340 and input device/interface 360, output device/interface 370, external storage 380, and/or network 390 may be wired or wireless. In other words, I/O interface 340 may be a wired and/or wireless interface that utilizes any communication or I/O protocols or standards, including, for example, Ethernet, 802.11x, Universal Serial Bus (USB), Wi-Fi™, WiMAX, cellular communication protocols, satellite communication protocols, and/or the like.

Figure 4A:
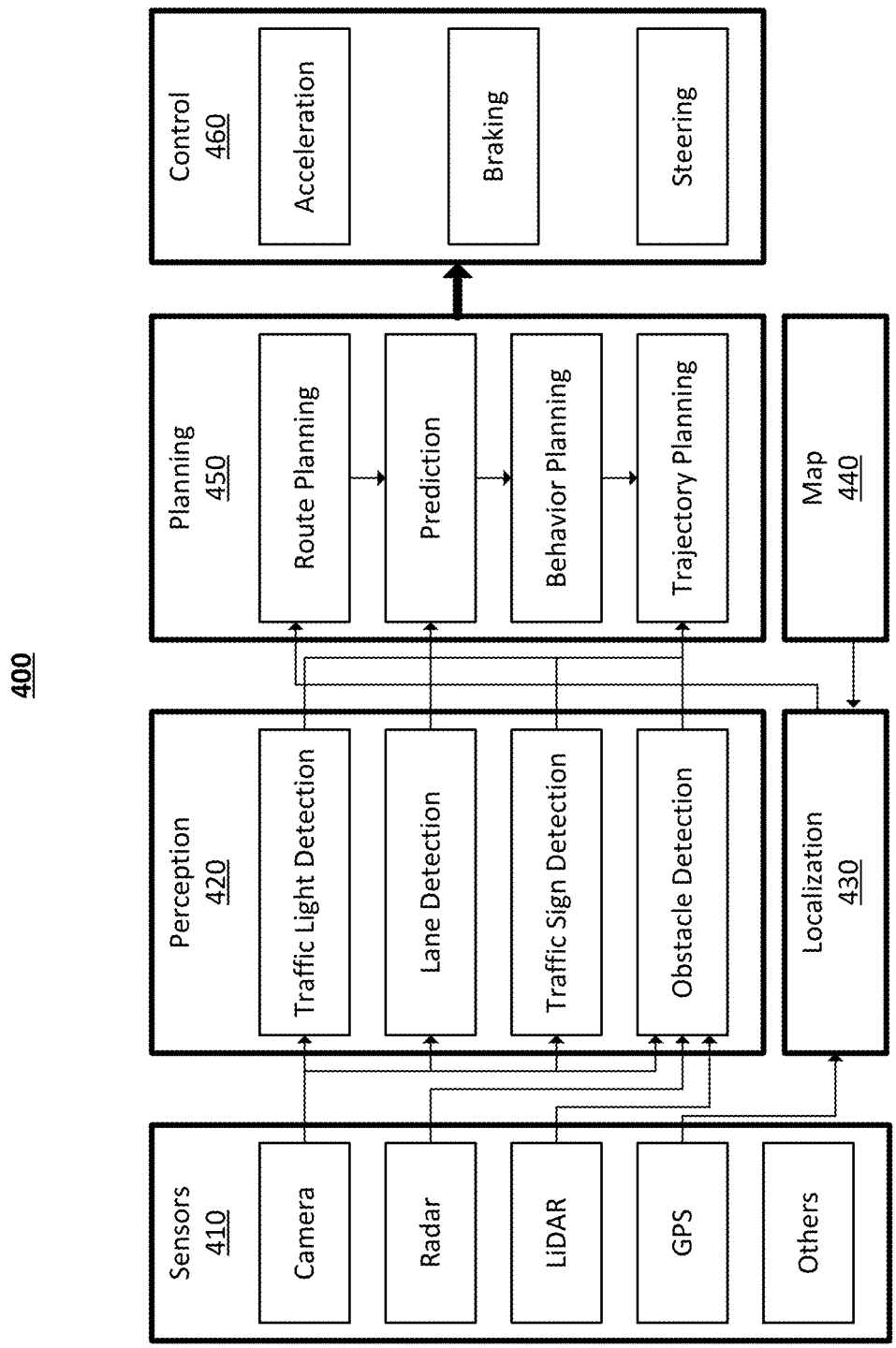
FIGS. 4A and 4B illustrate example architectures for an autonomous driving system, according to example implementations.

FIG. 4A illustrates an example architecture 400 for an autonomous driving system that is capable of achieving Level 4 or Level 5 autonomy, according to an example implementation. As illustrated, architecture 400 comprises sensors 410, perception module 420, localization module 430, map module 440, planning module 450, and control module 460. However, it should be understood that other implementations may utilize more, fewer, or a different combination and/or arrangement of modules.

Sensors 410 are mounted on vehicle 100 to monitor and observe the location and movement of objects surrounding vehicle 100. In a typical implementation, sensors 410 may comprise one or more cameras (e.g., cameras 120), one or more radars (e.g., radars 130), LiDAR, a GPS sensor, an Inertial Measurement Unit (IMU), and/or the like. Each type of sensor has its own advantages and disadvantages. For example, LiDAR is relatively accurate and can generate a three-dimensional image of the vehicle's surroundings, but is also expensive to deploy and has difficulty with adverse weather conditions, such as rain and fog. On the other hand, cameras are much less expensive than LiDAR and can work under adverse weather conditions, just like human eyes. Thus, many AD vehicles utilize sensor-fusion technology to integrate different types of sensors for more accurate and robust object detection.

Perception module 420 translates raw data from sensors 410, including, for example, color images and/or point cloud data, into a deep understanding of the vehicle's surrounding environment, including, for example, object recognition and tracking, the locations and movements of objects, and/or the like. Common objects that are detected by perception module 420 include, without limitation, other vehicles and pedestrians to avoid collisions, traffic lights and traffic signs to obey traffic rules, and lane markers to remain in road lanes. With advancements in artificial intelligence (AI) and computational power, deep neural networks (DNN) are commonly used to locate and classify objects with great effectiveness and reliability. However, perception module 420 must also be capable of tracking the objects and estimating future trajectories of the objects to support dynamic path planning and collision avoidance. Many successful tracking methods follow the tracking-by-detection paradigm, in which the output of object detection (e.g., appearance-based object detection) serves as the observations for tracking. The task of tracking multiple objects then amounts to linking the correct object detections across time to form current object trajectories, from which future object trajectories can be estimated.

Localization module 430 identifies the location of vehicle 100, typically, within ten centimeters or less. The GPS sensor can help in this regard, but its accuracy of approximately one to five meters is not sufficient to localize the road lane in which vehicle 100 is driving, for example, to ensure that vehicle 100 is driving within the center of the lane. Thus, some AD vehicles 100 include a map module 450 that utilizes LiDAR to scan the possible areas in which vehicle 100 can pass while vehicle 100 is driving, and generate a high-definition map. This high-definition map can be used by localization module 430 to determine the precise location of vehicle 100 within the road.

Planning module 450 utilizes the information about vehicle 100 and its environment, output by perception module 420 and localization module 430, to plan a path for vehicle 100 through its environment. In particular, planning module 450 generates a series of waypoints on the road along the vehicle's estimated trajectory and designates the speed at which vehicle 100 should pass through each waypoint. The waypoints are constantly updated based on feedback from perception module 420 and localization module 430. For example, if perception module 420 predicts that a vehicle in front of vehicle 100, along the vehicle's estimated trajectory, is going to decelerate, planning module 450 determines that vehicle 100 will need to reduce its speed through upcoming waypoints. As another example, if perception module 420 determines that an upcoming traffic light, along the vehicle's path is about to turn red, planning module 450 may add a complete stop to the series of waypoints.

Control module 460 utilizes the series of waypoints with designated speeds, output by planning module 450, to issue control signals to engine 150 and/or other actuation systems (e.g., braking system 162, differential mechanism 164, steering system 166, etc.). For example, the control signals represent commands for accelerating, braking, and steering. Control module 460 may constantly compare actual vehicle dynamics to target vehicle dynamics, and update the control signals based on algorithms, such as proportional-integralderivative (PID), to minimize the difference between the actual and target vehicle dynamics (e.g., in a feedback loop).

Sensor-fusion technology may be used to fuse information from different types of sensors 410. However, sensor fusion presents complex problems. One problem is the high cost of complex sensor architectures. Ultrasonic and radar arrays are more expensive than traditional cameras 120, and LiDAR can be much more expensive than ultrasonic and radar arrays. Another problem is that, as the number of sensors 410 increases, the amount of computational resources required to process the sensor outputs increases. However, ECU 110 has space, power consumption, and cost requirements that limit the amount of computational resources that can be included in ECU 110.

Figure 4B:
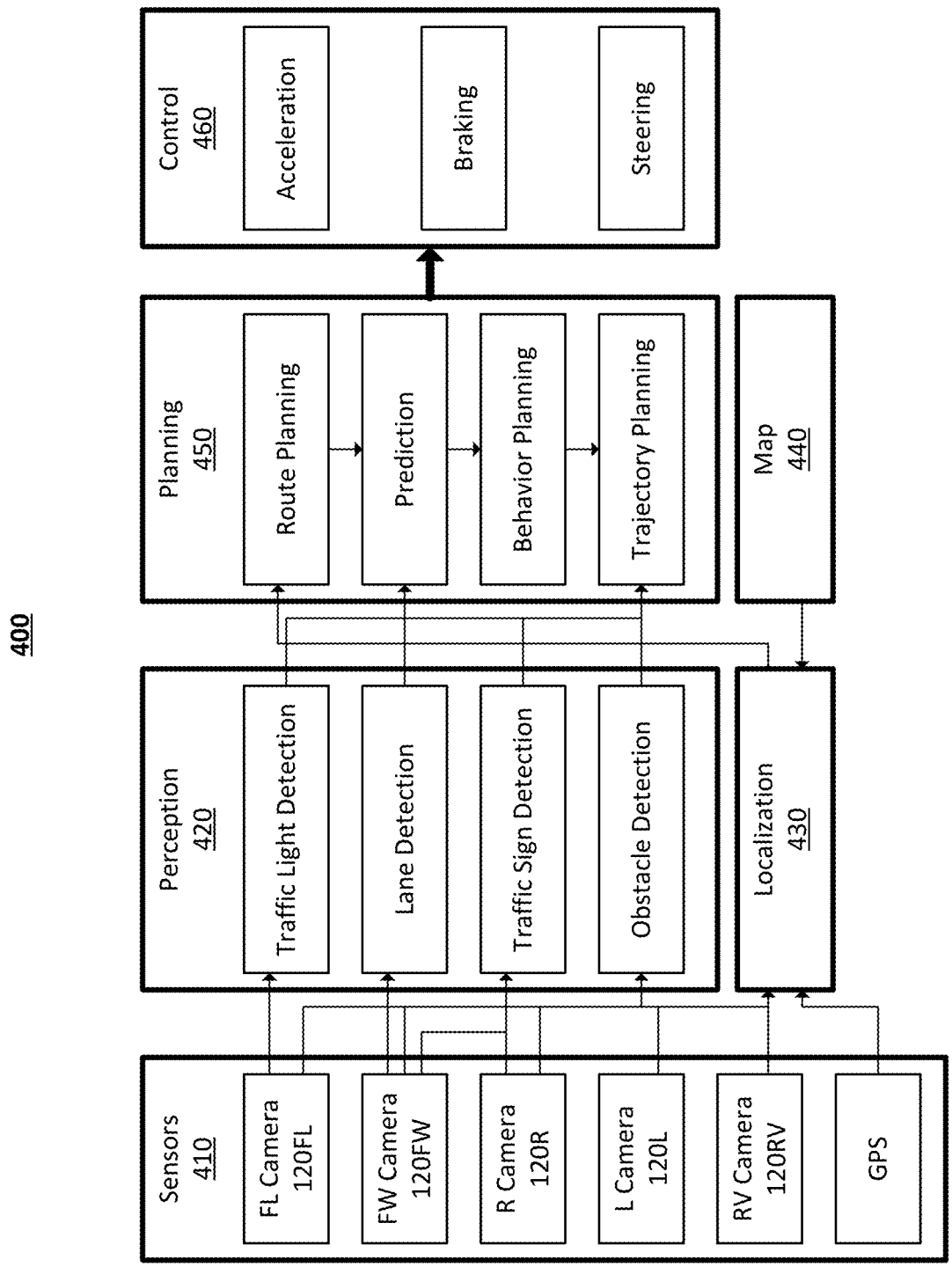

Thus, in an implementation, vehicle 100 may utilize an array of cameras 120 that replaces the function of LiDAR by incorporating both long-range and short-range cameras 120 (e.g., 120FL and 120FW). Thus, LiDAR may be omitted from vehicle 100, and radar 130 may be optional (e.g., omitted or included) in vehicle 100. FIG. 4B illustrates an example architecture 400 for an autonomous driving system that is capable of achieving Level 4 or Level 5 autonomy, according to an alternative implementation to the implementation illustrated in FIG. 4A. Architecture 400 in FIG. 4B differs from architecture 400 in FIG. 4A in that sensors 410 replace radar and LiDAR with an array of cameras. In all other respects, the two architectures 400 may be similar or identical. Thus, the descriptions of perception module 420, localization module 430, map module 440, planning module 450, and control module 460, with respect to FIG. 4A, may be applied equally to the corresponding modules illustrated in FIG. 4B.

In the illustrated implementation, sensors 410 comprise forward long camera 120FL, forward wide camera 120FW, right camera 120R, left camera 120L, rearview camera 120RV, and a GPS sensor. Perception module 420 and localization module 430 can perform the same functions as described with respect to FIG. 4A, with the image data produced by the array of five cameras 120FL, 120FW, 120R, 120L, and 120RV or other configurations of cameras 120.

Perception module 420 may utilize the images, output by each camera 120, for different object recognition tasks. For example, forward long camera 120FL may output images for traffic light detection and obstacle detection in perception module 420 and localization in localization module 430, forward wide camera 120FW may output images for lane detection, traffic sign detection, and obstacle detection in perception module 420 and localization in localization module 430, right camera 120R may output images for traffic sign detection and obstacle detection in perception module 420 and localization in localization module 430, left camera 120L may output images for obstacle detection in perception module 420 and localization in localization module 430, rearview camera 120RV may output images for obstacle detection in perception module 420 and localization in localization module 430, and the GPS sensor may provide GPS information (e.g., coordinates representing latitude, longitude, and elevation) for localization in localization module 430. Notably, since, in most countries, traffic signs ordinarily appear on the right side of vehicle 100, only forward wide camera 120FW and right camera 120R need to be employed for traffic sign detection in perception module 420. It should be understood that, in other countries, in which traffic signs ordinarily appear on the left side of vehicle 100, forward wide camera 120FW and left camera 120L may be employed for traffic sign detection in perception module 420, and, more generally, the roles of right camera 120R and left camera 120L, as discussed herein in various examples and implementations, may be reversed. In addition, due to the need to recognize traffic lights in advance of reaching each traffic light, forward long camera 120FL should be employed for traffic light detection. All cameras 120 can be used for obstacle detection in perception module 420.

An array of cameras 120 may output very large amounts of image data. In addition, as vehicles move towards greater autonomy, the number of cameras 120 may increase, the resolution of each camera 120 may increase (e.g., to eight megapixels or greater), and the frame rates of cameras 120 may increase (e.g., to sixty frames per second (FPS) or greater). It is estimated that a camera with 2.3-megapixel resolution at thirty frames per second produces 0.83 gigabytes of raw image data per second, while a camera with 8.3-megapixel resolution at the same frame rate produces 5.98 gigabytes per second. Thus, a 10-gigabit Ethernet cable may be unable to handle all of the image data output by an array of five or more cameras 120. This means that a vision system for an autonomous vehicle 100 will need to optimize data flow from the array of cameras 120 in order to offer high levels of reliability and functional safety, real-time execution with low latency, minimal power consumption, the flexibility to operate with different camera configurations, and/or the ability to implement AI algorithms for perception module 420.

Image compression techniques can be used to reduce the resource requirements required to store, transfer, and process the image data that are output by the array of cameras 120. For example, image compression enables more images to be stored in a given amount of memory space, and also reduces the time required to transfer image data per time unit. In addition, when the processing capability of ECU 110 is a bottleneck, the use of image compression can enable ECU 110 to process the image data in a sufficiently timely manner for autonomous driving.

There are numerous image compression techniques available. These image compression techniques can be compared in terms of compression ratio, processing speed, and information loss. With respect to information loss, an image compression algorithm may be lossless or lossy. With lossless image compression, the image can be decompressed without losing any information from the original image. In other words, the decompressed image is identical to the original image. However, generally, for lossless image compression algorithms, the compression ratio (i.e., the size of the original image to the size of the compressed image) is low and the processing speed is slow. Lossy image compression algorithms were developed to achieve higher compression ratios and faster processing speed by constructing an approximation of the original image. In other words, lossy image compression algorithms accept information loss in exchange for a better compression ratio and faster processing speed.

Figure 5:
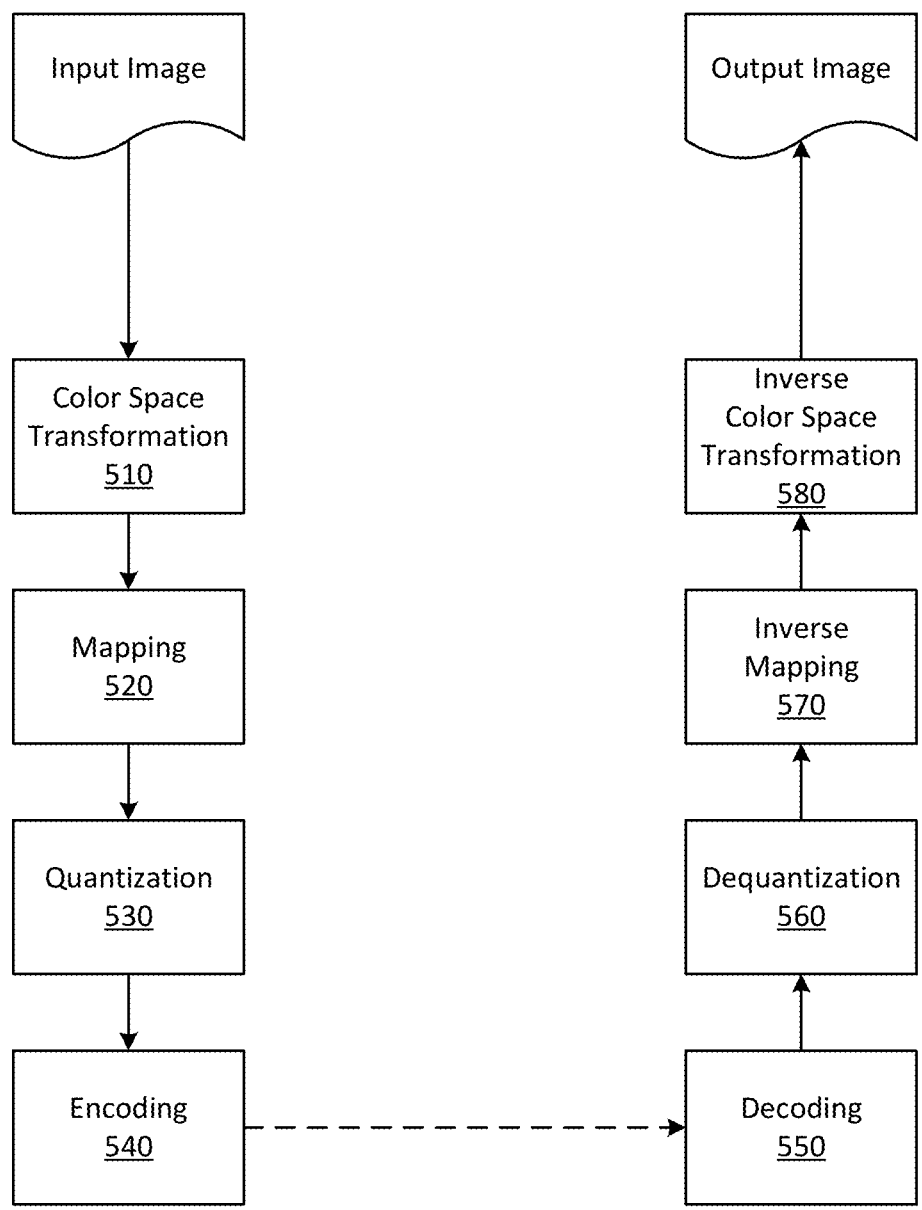
FIG. 5 illustrates an example image compression process, according to an example implementation.

FIG. 5 illustrates an example image compression process 500, according to an example implementation. Process 500 represents a general template for image compression that is used by numerous different image compression techniques. The differences between image compression techniques will generally be in the implementation of various subprocesses to achieve the desired tradeoffs between compression ratio, processing speed, and information loss.

In subprocess 510, an input image is converted to a different color space. Images are commonly represented in the red-green-blue (RGB) color space with red, green, and blue components. However, in the RGB color space, the red, green, and blue components have equal weights, which hinders compression. Thus, in subprocess 510, the input image is converted from the RGB color space into the YCbCr color space. The YCbCr color space is an alternative three-component color space, in which Y represents luminance (i.e., indicating the intensity in the image) and CbCr represents chrominance (i.e., indicating how colorful the image is), with Cb representing blueness and Cr representing redness. In the context of image compression, the purpose of converting the input image to the YCbCr color space is that the chrominance channels (Cb and Cr) are usually better to compress, because they contain much less information than the luminance (Y) channel.

In subprocess 520, a mapping transforms the pixel values of the input image in the YCbCr color space into interpixel coefficients. This transformation does not result in the loss of information, since the interpixel coefficients can be transformed back to the pixel values. While subprocess 520 can achieve some compression, it is primarily preparation for subsequent subprocesses.

In subprocess 520, spatial data is transformed into the frequency domain. Because human eyes are generally less sensitive to high-frequency components, these high-frequency components can be removed from the image data to reduce overhead. The frequency transformation can extract frequency components, which are uniformly distributed in the spatial data, and place the same frequency components together. Once the high-frequency components are placed together, they can be easily removed using quantization.

In subprocess 530, quantization is performed on the transformed image data. Quantization refers to the process of rescaling the interpixel coefficients after the transformation has been applied. In subprocess 530, actual data is discarded. Quantization uses the quantized values to divide and round the interpixel coefficients. For example, a scalar quantizer reduces a range of values by reducing precision. Since subprocess 530 discards information, subprocess 530 necessarily converts process 500 into a lossy image compression algorithm. Thus, it should be understood that subprocess 530 would not be present in a lossless image compression technique.

In subprocess 540, the quantized data is entropy encoded. The objective of encoding is to use a model (e.g., codewords) to more efficiently represent the image data. Subprocess 540 converts a matrix representation of the input image into a bitstream that can be decoded in subprocess 550 to restore the matrix representation of the input image without losing information. In other words, the encoding procedure of subprocess 540 is lossless.

In subprocesses 550-580, the encoded image data, output from subprocess 540, are converted into an output image (e.g., with a loss of information for lossy image compression and no loss of information for lossless image compression). In particular, subprocess 550 decodes the bitstream back into a matrix representation of the image data, as the inverse of subprocess 540. Then, subprocess 560 dequantizes the image data as the inverse of subprocess 530, subprocess 570 performs an inverse mapping as the inverse of subprocess 520, and subprocess 580 converts the image data from the YCbCr color space into the RGB color space as the inverse of subprocess 510, to produce the output image.

There is not a single image compression technique that is suitable for all autonomous driving applications and sensor architectures. Lossy image compression techniques can reduce the accuracy of object recognition, whereas lossless image compression techniques may overload ECU 110. Examples of image compression techniques include, without limitation, Joint Photographic Experts Group (JPEG) level 10, JPEG level 50, JPEG level 60, JPEG extended range (XR) level 60, JPEG-LS (lossless/near-lossless) level 60, JPEG 2000, and Portable Graphics Format (PNG).

In an embodiment, image compression techniques are selected dynamically for compression of images being output by each camera 120 of autonomous vehicle 100. In other words, different image compression techniques may be applied to the outputs from different cameras 120, such that the images from a first camera 120 are compressed at a higher compression ratio than images from a second camera 120. In this manner, one or more cameras 120 may be prioritized over other cameras 120 by assigning image compression techniques with less information loss (e.g., but lower compression ratios and longer processing times) to those camera(s), and assigning image compression techniques with more information loss (e.g., but higher compression ratios and shorter processing times) to the other cameras. This enables information to be balanced against resource usage, to ensure that all of the information necessary for autonomous driving is being collected, while simultaneously ensuring that there are sufficient computational resources to process that information within the necessary time frames for autonomous driving. Image compression techniques may be assigned to cameras 120 based on various features, such as the position of vehicle 100, the speed of vehicle 100, camera visibility, prior object detection results, current load on ECU 110, and/or the like.

Figure 6A:
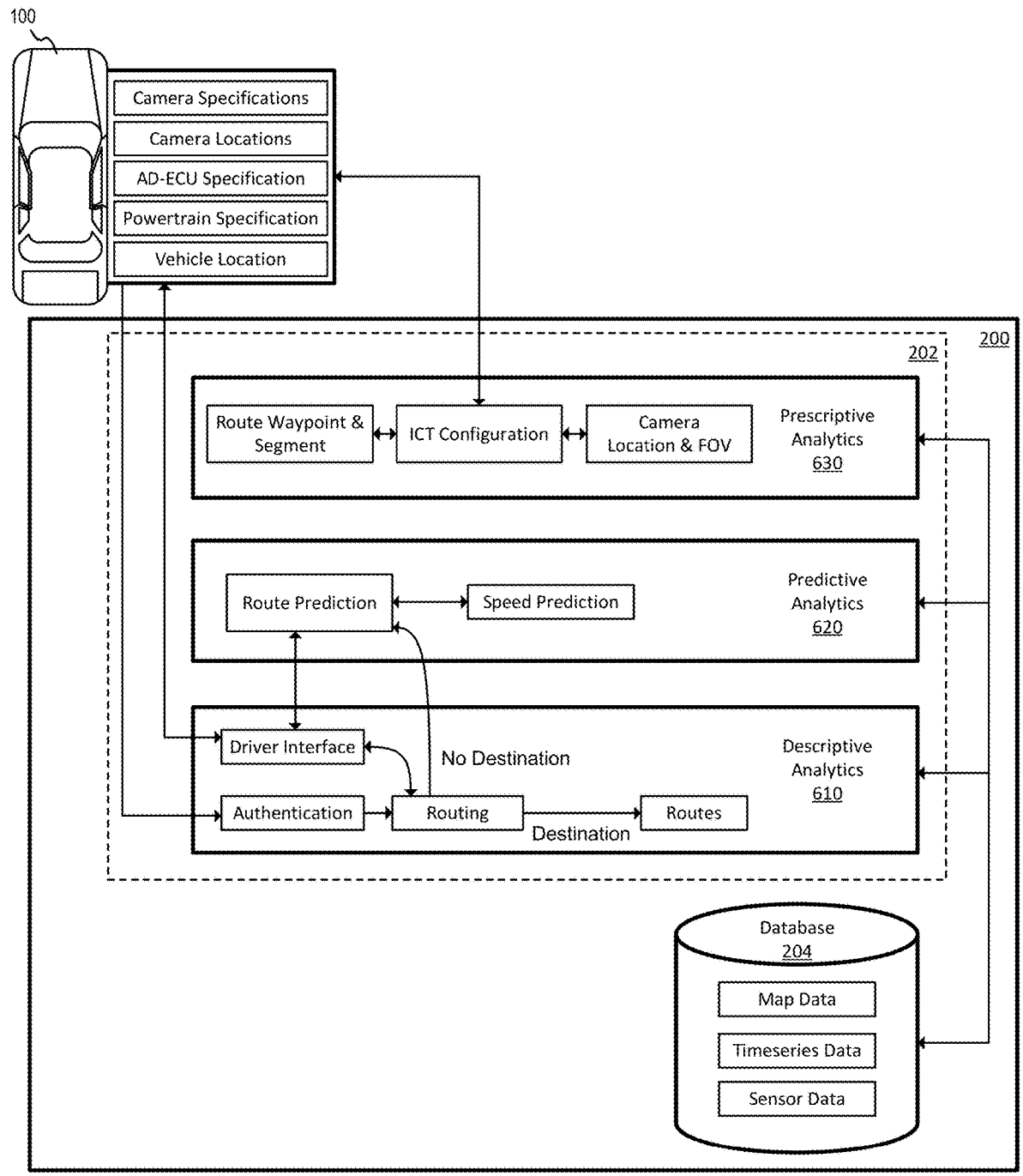
FIGS. 6A and 6B illustrate example architectures and data flows for assigning image compression techniques to an array of cameras, according to example implementations.

FIG. 6A illustrates an example architecture and data flow for assigning image compression techniques to cameras 120 mounted in an autonomous vehicle 100, using platform-based analytics, according to an example implementation. The architecture comprises a descriptive analytics module 610, a predictive analytics module 620, and a prescriptive analytics module 630, which are included in software 202 hosted on platform 200. The objective of the analytics is to provide control values to vehicle 100 based on user input and/or prediction.

The architecture also comprises database 204. Database 204 may comprise map data, timeseries data, sensor data, and/or the like. For example, map data may include required FOV maps, high-definition maps, regular maps, road profiles, and/or the like. Timeseries data may comprise sensor data, traffic data, weather data, vehicle CAN data, Vehicle-to-Everything (V2X) data, and/or the like. Sensor data may comprise infrastructure information, camera information, CAV data, cellphone camera data, and/or the like. It should be understood that platform 200 may communicate with other services and platforms (e.g., a map provider, service provider, etc.) to acquire and manage the data stored in database 204 and/or utilized by software 202.

Vehicle 100 may use Dedicated Short-Range Communications (DSRC), broadband cellular communications (e.g., 5G standard), or the like, to connect to platform 200 via one or more networks 210. Vehicle 100 may transmit vehicle data to descriptive analytics 610 using broadcasting protocols, such as Message Queuing Telemetry Transport (MQTT), User Datagram Protocol (UDP), and/or the like. The vehicle data may comprise the specifications of cameras 120 in vehicle 100, the locations of cameras 120 in vehicle 100, the specification of ECU 110 in vehicle 100, the specification of the power train in vehicle 100, the location of vehicle 100, and/or the like.

Descriptive analytics 610 may comprise sub-modules that implement authentication, routing, data processing, and/or the like. In particular, the authentication sub-module may decrypt the incoming vehicle data transmitted by vehicle 100 using cryptographic hash algorithms, such as Message Digest 5 (MD5), Secure Hash Algorithm 1 (SHA-1), Secure Hash Algorithm 2 with 256-bit hash values (SHA-256), and/or the like. If the vehicle data contains a destination of vehicle 100, a routing sub-module uses routing details from the vehicle data—such as vehicle location, vehicle destination, a high-definition map (e.g., generated by map module 440 of vehicle 100), traffic information, weather information, and/or the like—to determine route(s) to the vehicle destination.

If the vehicle data does not contain a destination (e.g., because the driver did not set a destination), a route prediction sub-module in predictive analytics module 620 may use an AI-model to predict the driver's destination, based on one or more features stored in database 204. These features may include, for example, the driver's profile, historic trip data (e.g., past destinations), time of day, and/or the like. A driver interface sub-module in descriptive analytics module 610 may share the predicted destination with the driver of vehicle 100 via human-machine interface 170 (e.g., comprising a display in vehicle 100 and/or via AI-based voice assistance). Once the driver confirms the destination via the driver interface sub-module, the routing sub-module of descriptive analytics module 610 may determine route(s) to the confirmed destination. The determined route(s), along with speed predictions from predictive analytics module 620, may be provided to prescriptive analytics module 630.

Prescriptive analytics module 630 may comprise a route waypoint and segment sub-module, a camera location and field of view sub-module, and an image compression technique (ICT) configuration sub-module. It should be understood that prescriptive analytics module 630 may comprise other sub-modules related to safety, efficiency, comfort, and/or the like. The road waypoint and segment sub-module may use the current location of vehicle 100 to retrieve information about a current waypoint and/or route segment, which correspond to the current location of vehicle 100, on which vehicle 100 is traveling. This information may be retrieved from map data in database 204, in real time or periodically at a given time interval (e.g., every 50 milliseconds, every second, etc.). The camera location and field of view (FOV) sub-module may retrieve the locations and/or fields of view of each camera 120 in vehicle 100 from the camera locations and specifications in the vehicle data. The ICT configuration sub-module may use the retrieved information about the current and/or future waypoint and/or route segment, the camera locations and/or fields of view, and/or other features to select a suitable image compression technique (e.g., compression type and level) for each camera 120 in vehicle 100. The image compression technique to be used for each camera 120 may be selected using a lookup table, decision tree, or other mechanism that associates features (e.g., combinations of features) with image compression techniques.

Figure 6B:
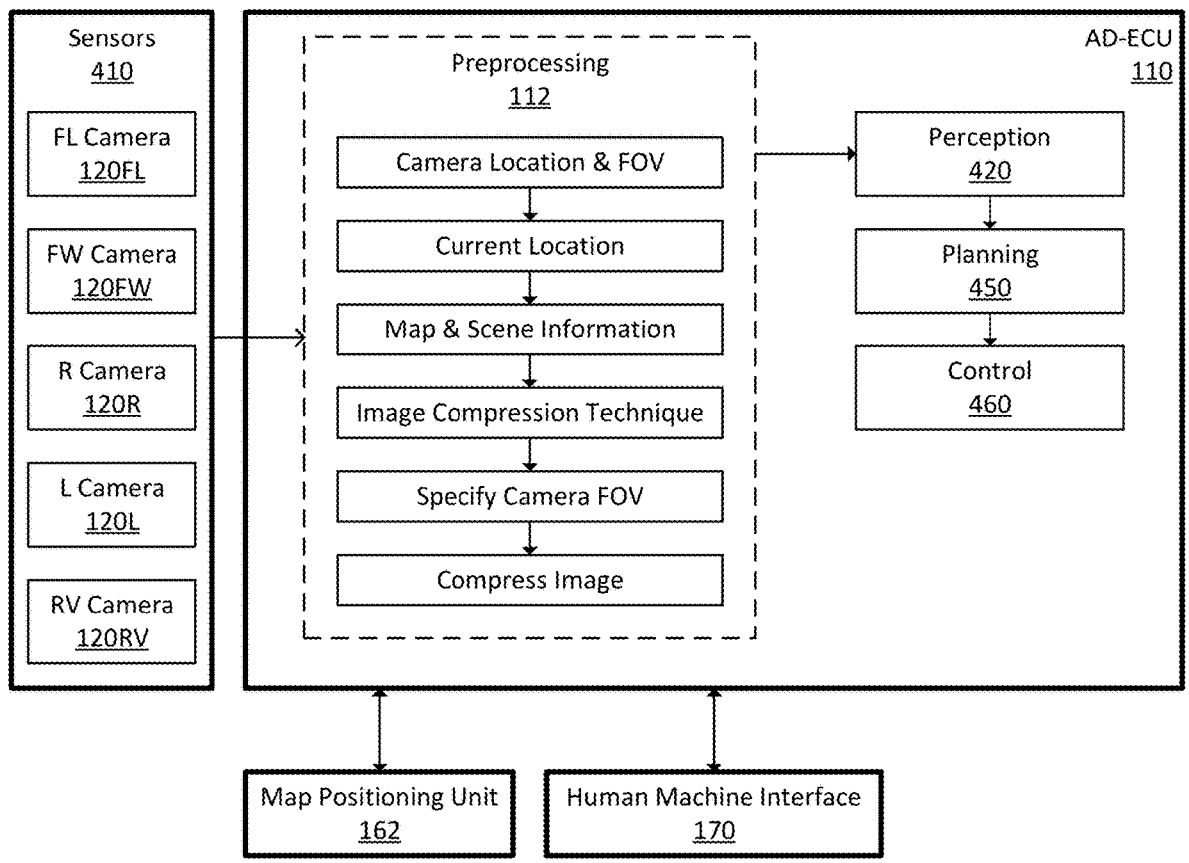

FIG. 6B illustrates an example architecture and data flow for assigning image compression techniques to cameras 120 mounted in an autonomous vehicle 100, onboard ECU 110, according to an example implementation. Cameras 120 capture image data synchronously during operation of vehicle 100. Initially, when vehicle 100 has been started and/or the driver has input a destination (e.g., via human-machine interface 170), each camera 120 may be configured with a default field of view. A preprocessing module 112 in ECU 110 may receive the images from each camera 120. Each image may be associated with the location of camera 120 by which it was captured and the field of view from which it was captured. Preprocessing module 112 may determine the precise current location of vehicle 100 using map positioning unit 142. Based on the current location of vehicle 100, preprocessing module 112 may extract features about vehicle 100 or its environment, including current map information and/or current scene information, such as the direction of travel of vehicle 100 (e.g., straight, right turn, left turn, etc.). Preprocessing module 112 may then select an image compression technique (e.g., type and level) to be used for the images associated with each camera 120, on a per-camera basis, based on the features. This selection may be performed using a lookup table, decision tree, or other mechanism that associates features (e.g., combinations of features) with image compression techniques. Once preprocessing module 112 has selected an image compression technique for each camera 120, preprocessing module 112 may compress the images from each camera 120 according to the image compression technique selected for that camera 120. It should be understood that the images from one camera 120 may be compressed using a different image compression technique than images from other cameras 120, according to the particular ICT configuration selected by preprocessing module 112. Finally, preprocessing module 112 outputs the compressed images to perception module 420. It should be understood that preprocessing module 112 may continue to operate in this manner for the vehicle's entire route from start to destination.

In addition to an ICT configuration, preprocessing module 112 or the ICT configuration sub-module (or other sub-module) of prescriptive analytics 630 may also determine a field of view to be used for each camera 120, based on one or more features. Each camera 120 may then be configured to capture the field of view that has been determined for that camera 120. A field of view may be increased (e.g., to capture lower resolution images of a larger or wider area), decreased (e.g., to capture higher resolution images of a smaller or narrower area), or changed in shape (e.g., to capture images at a different aspect ratio). Alternatively, each camera 120 may always maintain the same field of view.

FIG. 7 illustrates an example lookup table 700 that may be used by preprocessing module 112 or the ICT sub-module of prescriptive analytics 630 to select the image compression technique for each camera 120, according to an example implementation. In particular, an ICT configuration, comprising an image compression technique to be used for each camera 120 in the array of cameras 120 in vehicle 100, may be selected based on one or a plurality of categories of features, including, without limitation, road type, direction, lane information, weather, time, target recognition, speed, ECU, and/or others. The road type category may comprise highway, urban, and/or other road types. The direction category may comprise straight, right turn, left turn, and/or other directions (e.g., reverse). The lane information category may comprise the total number of lanes, the lane number in which vehicle 100 is currently traveling, the localization of vehicle 100 with the current lane, the width of the current lane, and/or other lane information. The weather category may comprise sunny, cloud, rainy, foggy, and/or other types of weather. The time category may comprise day, night, and/or more granular delineations of the day. The target recognition category may comprise obstacle, lane, road feature, traffic sign, traffic light, anomaly, pedestrian, animal, and/or any other detectable object of potential interest. The speed category may comprise current speed and future speed. The ECU category may comprise the load and/or usage of ECU 110 in vehicle 100, the power consumed by ECU 110 in vehicle 100, and/or any other aspect of ECU 110 in vehicle 100. It should be understood that more, fewer, or a different combination of features may be used. In any case, lookup table 700 may associate different ICT configurations for the array of cameras 120 with the presence or values of one or a combination of the features.

Figure 8:
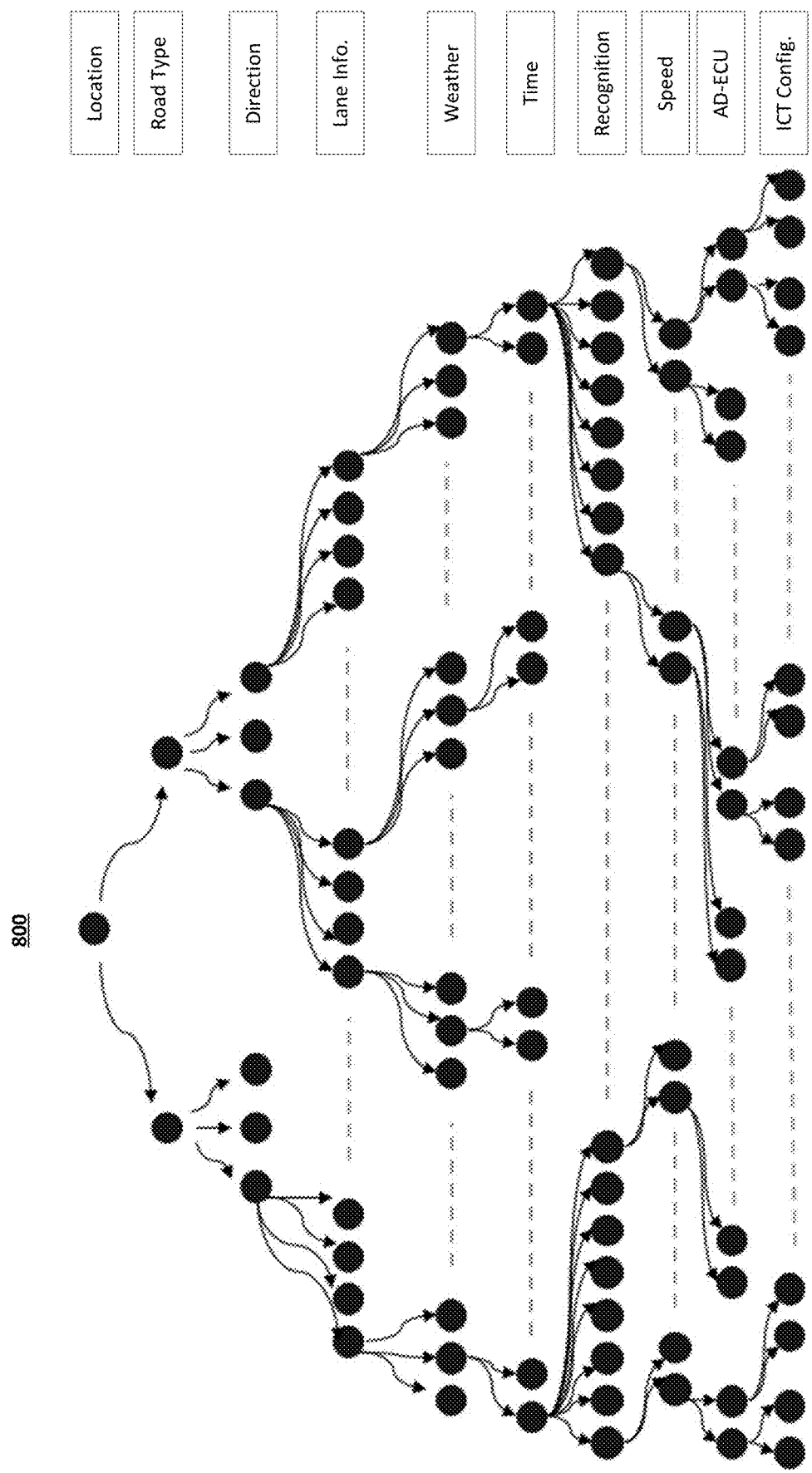
FIG. 8 illustrates an example decision tree that may be used to select image compression techniques for an array of cameras, according to an example implementation.

FIG. 8 illustrates an example decision tree 800 that may be used by preprocessing module 112 or the ICT sub-module of prescriptive analytics 630 to select the image compression technique for each camera 120, according to an example implementation. A path may be followed through decision tree 800, based on the presence or values of various features (e.g., represented by internal nodes in decision tree 800, and starting, for example, with vehicle location), until an ICT configuration (e.g., represented by leaf nodes in decision tree 800) is reached. It should be understood that the ICT configuration that is reached is the ICT configuration to be used for the array of cameras 120 in vehicle 100. In the illustrated example, the categories of features that are represented in decision tree 800 include vehicle location, road type, direction, lane information, weather, time, target recognition, speed, and ECU. However, it should be understood that more, fewer, or a different combination of features may be utilized in decision tree 800.

While not specifically illustrated, another category of feature may be warning sounds sensed by audio sensor 148. This category may comprise features such as railroad crossing, vehicle horn, emergency vehicle, and/or the like. Audio sensor 148, which may comprise one or a plurality of audio detectors (e.g., microphones), may be configured to detect the directionality of a warning sound, such that cameras 120 with a field of view in the direction of warning sounds can be prioritized. In other words, the image compression techniques, assigned to cameras 120 with a field of view in the direction of warning sounds, can be upgraded to improve the ability of perception module 420 to identify the source of the warning sounds and the ability of planning module 450 to react to the warning sounds.

Figure 9:
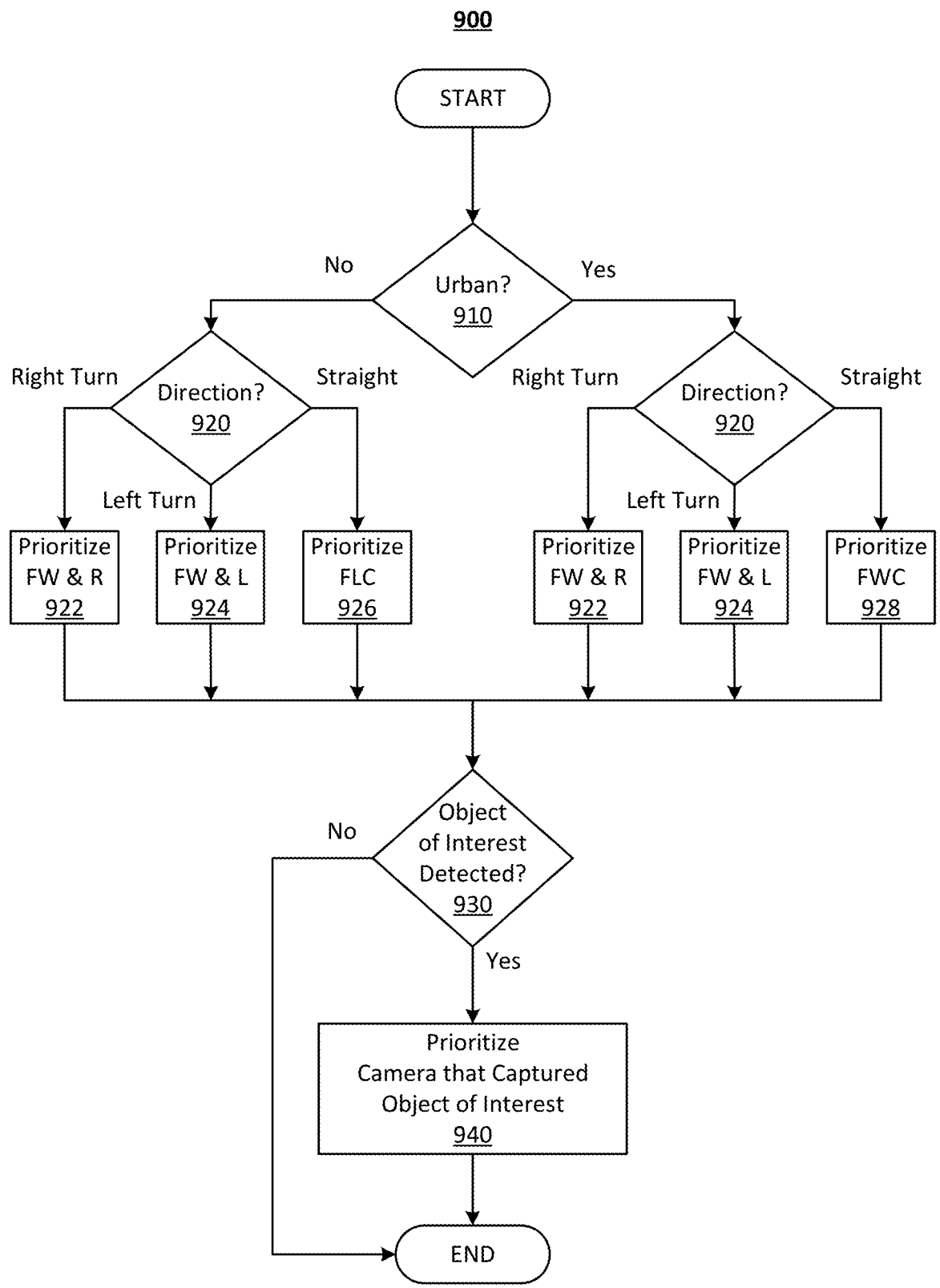
FIG. 9 illustrates example logic for prioritizing cameras, according to an example implementation.

FIG. 9 illustrates example logic 900 for prioritizing cameras, according to an example implementation. Logic 900 may be implemented as a lookup table, decision tree, and/or other mechanism, including potentially, a combination of a lookup table and decision tree. In node 910, the road type is determined. In either case, the direction of vehicle 100 is determined in node 920. If vehicle 100 is turning right (i.e., "Right Turn" in node 920), forward wide camera 120FW and right camera 120R are prioritized in node 922. If vehicle 100 is turning left (i.e., "Left Turn" in node 920), forward wide camera 120FW and left camera 120L are prioritized in node 924. If the road type is not urban (i.e., "No" in node 910) and vehicle 100 is driving straight forward (i.e., "Straight" in node 920), forward long camera 120FL is prioritized in node 926. On the other hand, if the road type is urban (i.e., "Yes" in node 910) and vehicle 100 is driving straight forward (i.e., "Straight" in node 920), forward wide camera 120FW is prioritized in node 928. In addition, if an object of interest has been detected in one or more of cameras 120 (i.e., "Yes" in node 930), each camera 120 in which an object of interest was detected is prioritized in node 940. Objects of interest may include any object, recognized by perception module 420 (e.g., immediately preceding execution of logic 900 by a second or milliseconds), to which an AD vehicle 100 may need to respond, including, for example, obstacles, lanes, road features, traffic signs, traffic lights, anomalies, pedestrian, animals, and/or the like. The result of logic 900 is a set of cameras 120 to prioritize. It should be understood that prioritization of a camera 120 refers to increasing the quality level (i.e., reducing information loss) of the image compression technique, used to compress images from that camera 120, relative to cameras 120 of lower priority.

For example, a vehicle 100 may be driving straight, when perception module 420 recognizes an object in the images from right camera 120R that resembles a speed-limit sign. Responsively, the ICT configuration may be adjusted to prioritize right camera 120R (e.g., by elevating the image compression technique assigned to right camera 120R to lossless) in order to improve the quality of images being provided to perception module 420 by right camera 120R, to thereby facilitate the detection of the current speed limit in subsequent executions of perception module 420. Once the speed limit has been confidently detected or the speed-limit sign can no longer be confidently detected, the ICT configuration may be adjusted to deprioritize right camera 120R (e.g., return the assigned image compression technique to a default image compression technique).

As mentioned above, the features may comprise characteristics of both the driving status and geographical status of vehicle 100. Example features related to driving status include, without limitation, direction, target recognition, and/or the like. Example features related to geographical status include, without limitation, road type, lane information, speed, and/or the like. Features related to geographical status may be acquired based on the current route segment on which vehicle 100 is driving, which may be derived from the current location (e.g., GPS coordinates and/or localization from localization module 430) of vehicle 100. In an implementation, cameras 120 may be prioritized based, solely or in part, on a combination of features related to both driving status and geographical status. In other words, different ICT configurations may be selected for different combinations of driving status and geographical status.

As mentioned above, one of the features that may be considered in selecting an ICT configuration is target recognition. For example, a camera 120 may be prioritized (e.g., assigned a higher-quality image compression technique) when an object of interest (e.g., obstacle) has been detected in the image stream from that camera 120. In addition, cameras 120 may be prioritized differently based on what object of interest was detected. In other words, the classes of objects (e.g., automobile, motorcycle, bicycle, pedestrian, animal, etc.) may themselves be prioritized, such that cameras 120 which have each detected an object of interest may be prioritized based on the priority of their respective detected objects. Thus, for instance, if a first camera 120 detects a first obstacle at the same time that a second camera 120 detects a second obstacle that is of a class that has a higher priority than the first obstacle, the second camera 120 may be prioritized over the first camera 120 based on the fact that the second obstacle is of a class that has a higher priority than the first obstacle. As an example, a pedestrian may be prioritized over a vehicle, such that cameras 120 that detect a pedestrian are prioritized over cameras 120 that simultaneously detect a vehicle.

As mentioned above, one of the features that may be considered in selecting an ICT configuration is load and/or usage of ECU 110 in vehicle 100. Electronic systems may include multiple processing units, called "cores," that run computational tasks in parallel. In an ECU 110, multiple cores could be integrated into a CPU, GPU, configurable logic block (CLB) in a Field-Programmable Gate Array (FPGA), and/or the like. As tasks are executed in parallel on the multiple cores, different cores may experience different loads. If a new task is assigned to a core with a heavy workload, this task may be delayed, thereby causing a deterioration in performance.

In an implementation, each camera 120 may be assigned to a dedicated core that compresses the image stream from that camera 120. The image compression technique that is assigned to each camera 120 may be scaled up or down based on the load on the core dedicated to that camera 120. The load on a core may be measured by the core's current temperature, voltage, and/or the like. For example, a camera 120 may be assigned a high-quality (e.g., level 80 or higher) image compression technique, such that the core, dedicated to that camera 120, reaches its processing limit while new images are waiting to be processed. This may cause "frame drop," in which some images are skipped so that the core can keep up with the image stream. To prevent this, the ICT configuration may be adjusted by scaling down the image compression technique assigned to that camera 120 to a lower-quality image compression technique (e.g., level 50), such that the load on the core, dedicated to that camera 120, decreases so as to prevent or reduce frame drop. In other words, if the computational load on a processor core is too high (e.g., exceeds a threshold), the priority of the camera 120, to which that processor core is dedicated, may be decreased, such that a lower-quality image compression technique is assigned to that camera 120.

Figure 10:
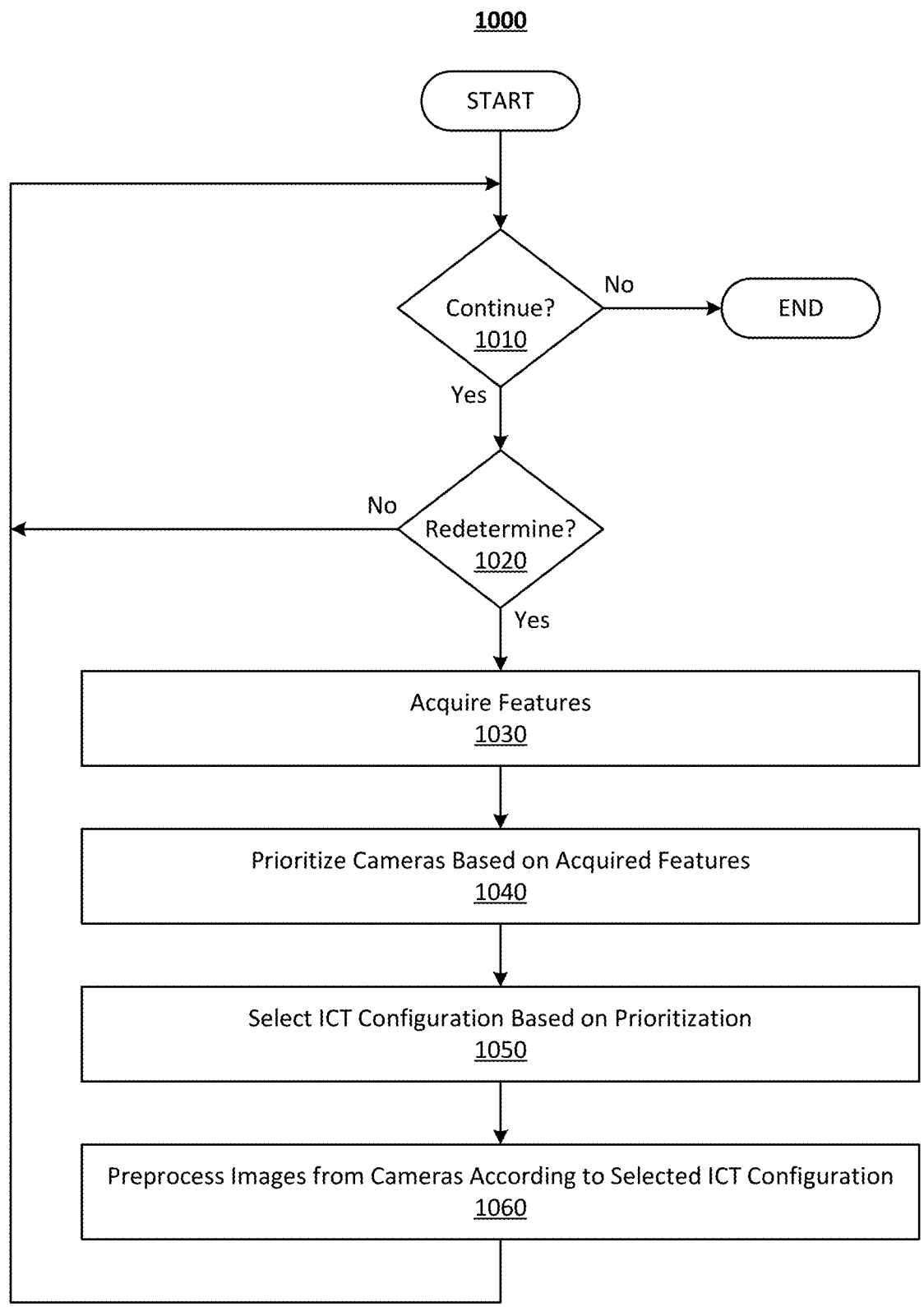
FIG. 10 illustrates an example process for dynamic image compression, according to an example implementation.

FIG. 10 illustrates an example process 1000 for dynamic image compression, according to an example implementation. While process 1000 is illustrated with a certain arrangement and ordering of subprocesses, process 1000 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 1000 continues (i.e., "Yes" in subprocess 1010) for as long as dictated by the particular implementation, and also ends (i.e., "No" in subprocess 1010) when dictated by the particular implementation. For example, process 1000 may continue for as long as vehicle 100 is turned on (e.g., starting at ignition and until vehicle 100 is turned off), for as long as vehicle 100 is moving, for as long as vehicle 100 is proceeding along a route to a set destination, and/or the like.

For as long as process 1000 continues, subprocesses 1030-1060 are iteratively performed in response to each occurrence of a redetermination event (i.e., "Yes" in subprocess 1020). If no redetermination event occurs (i.e., "No" in subprocess 1020), process 1000 waits for the next occurrence of the redetermination event. The redetermination event may comprise the expiration of a time interval (e.g., on the order of milliseconds, seconds, etc.), a transition of the current location of vehicle 100 from one route segment to the next route segment, a change in one or more features (e.g., in the categories of road type, direction, lane information, weather, time, target recognition, speed, and/or ECU) used to select the ICT configuration, and/or the like.

In subprocess 1030, the features used to select an ICT configuration are received, extracted, or otherwise acquired (e.g., by the ICT configuration sub-module of prescriptive analytics 630, by preprocessing module 112, etc.). In subprocess 1040, the acquired features are used to prioritize cameras 120. In subprocess 1050, the ICT configuration for the array of cameras 120 in vehicle 100 is selected based on the prioritization in subprocess 1040 (e.g., using lookup table 700, decision tree 800, etc.). The ICT configuration assigns an image compression technique, including a compression type and compression level, to each camera 120 in the array of cameras 120. For each camera 120, the images from that camera 120 will be compressed according to the image compression technique assigned to that camera in the ICT configuration. In general, cameras 120 with fields of view that contain objects of interest, or are more likely to contain objects of interest than the fields of view of other cameras 120, should be prioritized (e.g., via assignment of an image compression technique with less information loss) over those other cameras 120. In subprocess 1050, the selected ICT configuration is applied, such that subsequent images, received from the array of cameras 120, are compressed according to the assigned image compression techniques until the next redetermination event. The compressed images are provided to AD functions, such as perception module 420.

FIG. 11 provides an example scenario for illustrating dynamic image compression, according to an example implementation. In the illustrated example, vehicle 100 comprises an array of five cameras (i.e., 120FL, 120FW, 120R, 120L, and 120RV). However, it should be understood that the disclosed implementations can be equally or similarly applied to different configurations of cameras 120, including different numbers of cameras 120 and different arrangements of cameras 120.

As illustrated, vehicle 100 is about to transition from a current route Segment 1 to a next route Segment 2 that precedes a crosswalk before an intersection, along the vehicle's route on a rural road. In general, each route comprises a plurality of waypoints, with each route segment connecting two consecutive waypoints along the route. The distance between waypoints, representing the length of the route segments, may depend on the type of road. For example, route segments on a freeway may be longer than route segments on an urban street. The length of route segments may vary from a few meters to a few hundred meters.

Information about each route segment may be stored, for example, in database 204 on platform 200. In addition, the ICT configuration and FOV settings for each route segment or type of route segment may be stored for each of a plurality of sets of features (e.g., sensor configuration, time, weather, etc.). These ICT configurations and FOV settings may be stored in database 204 on platform 200 and/or onboard vehicle 100 (e.g., in ECU 110). The route segment information, ICT configuration, and/or FOV settings may be retrieved as needed based on the current location of vehicle 100 and the predicted route. For example, as vehicle 100 is traversing Segment 1, the route segment information, ICT configuration, and/or FOV settings may be retrieved for Segment 2 and potentially other upcoming route segments.

Figure 12A:
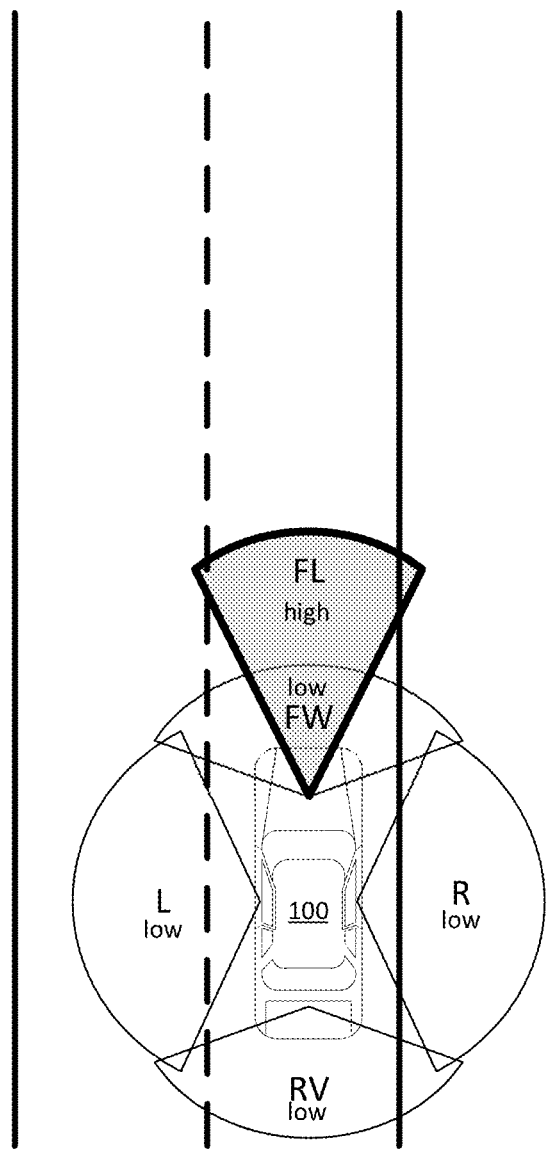
FIGS. 12A-12F illustrate example driving scenarios, according to example implementations.

FIG. 12A illustrates an example driving scenario, according to an example implementation. In this scenario, vehicle 100 is traveling straight along a rural road with no detected obstacles. In such a scene, only far away objects require special attention. Thus, in this case, process 1000 may determine that far objects in front of vehicle 100 should be prioritized, based on current location (e.g., route segment), road type (i.e., rural), speed (e.g., moderate to low), driving direction (i.e., straight), and/or the like. Thus, process 1000 may prioritize forward long camera 120FL over all other cameras 120 (e.g., 120FW, 120R, 120L, and 120RV), by assigning a lossless or near-lossless (e.g., level 80 or above) image compression technique to forward long camera 120FL and assigning one or more lossy image compression techniques (e.g., a default image compression technique, such as JPEG level 50) to the other cameras 120. In addition, process 1000 could determine that forward long camera 120FL should be configured with a smaller field of view, since far away objects will occupy less space. The rest of cameras 120 (e.g., 120FW, 120R, 120L, and 120RV) can be configured with the default field of view.

Figure 12B:
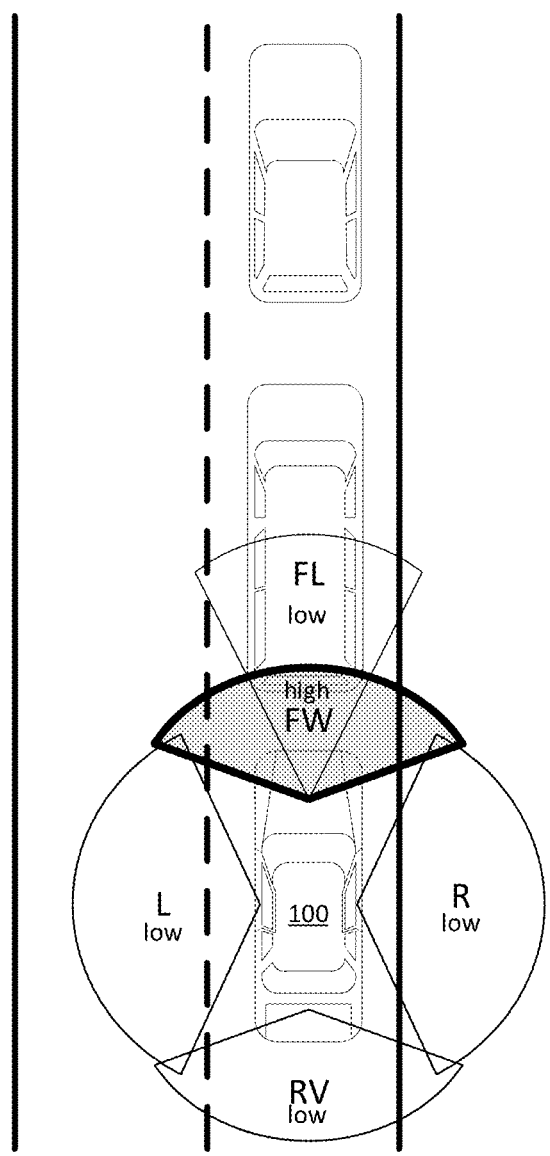

FIG. 12B illustrates another example driving scenario, according to an example implementation. In this scenario, vehicle 100 is traversing a route segment along a rural road with traffic. In this case, process 1000 may determine that objects close to the front of vehicle 100 should be prioritized. Thus, process 1000 may prioritize forward wide camera 120FW over all other cameras 120 (e.g., 120FL, 120R, 120L, and 120RV), by assigning a lossless or near-lossless image compression technique to forward wide camera 120F and assigning one or more lossy image compression techniques (e.g., a default image compression technique, such as JPEG level 50) to the other cameras 120. In addition, process 1000 could determine that forward wide camera 120FW should be configured with a larger field of view, since close objects will occupy more space, and the rest of cameras 120 (e.g., 120FL, 120R, 120L, and 120RV) should be configured with the default field of view.

Figure 12C:
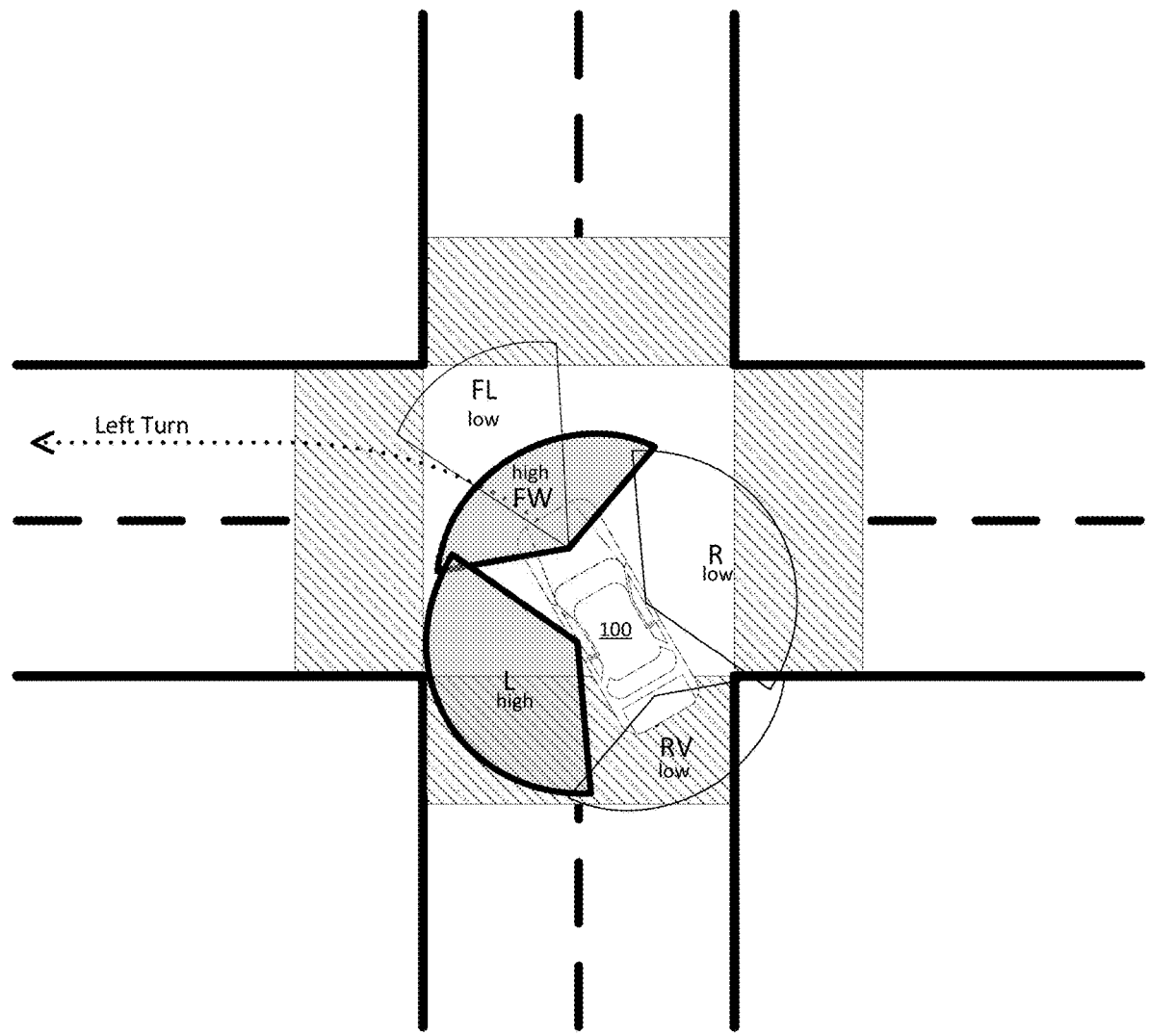

FIG. 12C illustrates another example driving scenario, according to an example implementation. In this scenario, vehicle 100 is turning left at a four-way intersection. In this case, process 1000 may determine that objects near the left front of vehicle 100 should be prioritized, since obstacles, if any, are most likely to appear at the left front of vehicle 100. Thus, process 1000 may prioritize cameras 120 with a field of view of the left front of vehicle 100. In particular, process 1000 may prioritize forward wide camera 120FW and left camera 120L over all other cameras 120 (e.g., 120FL, 120R, and 120RV), by assigning lossless or near-lossless image compression techniques to forward wide camera 120FW and left camera 120L, and assigning one or more lossy image compression techniques (e.g., a default image compression technique, such as JPEG level 50) to the other cameras 120.

Figure 12D:
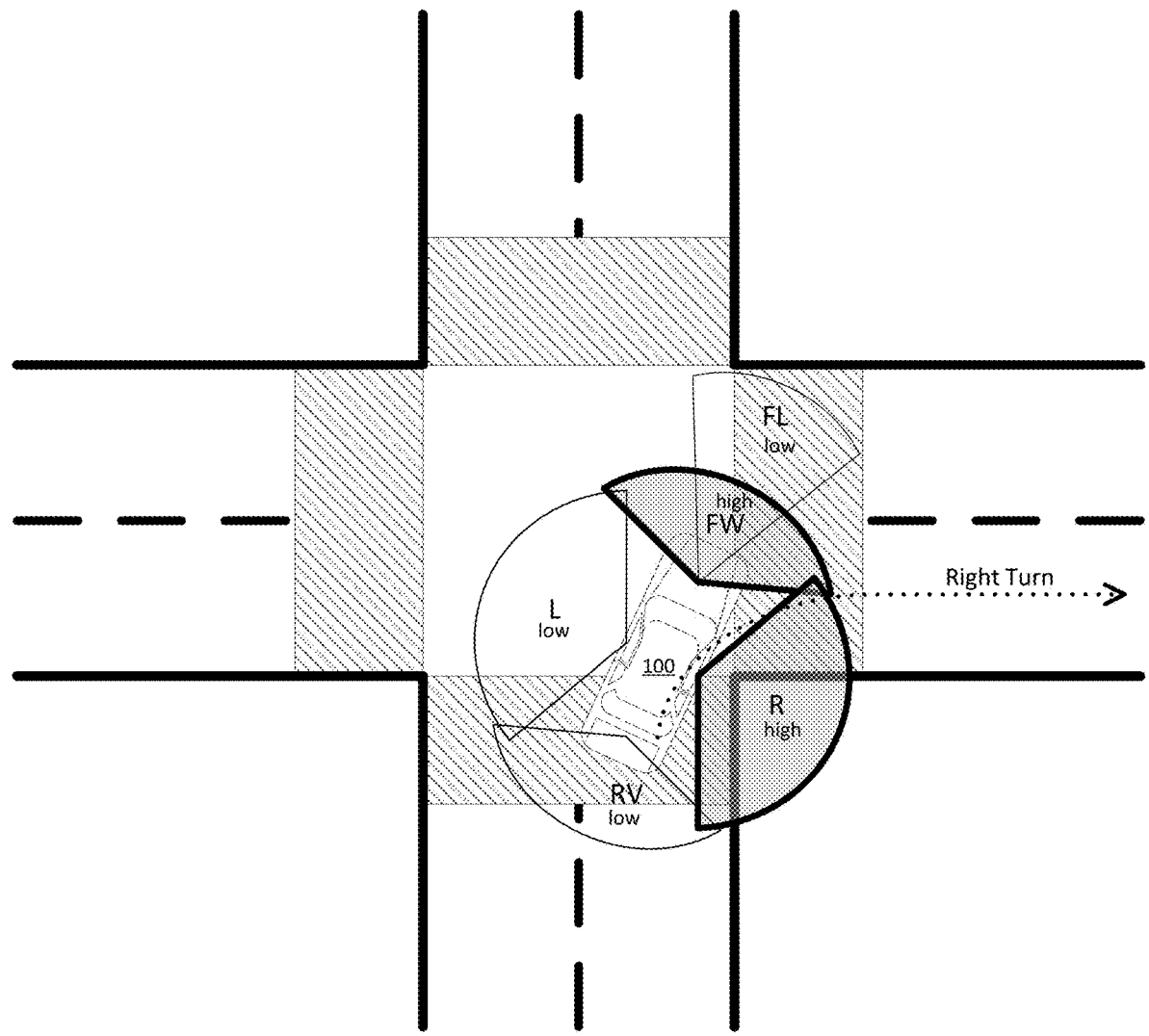

FIG. 12D illustrates another example driving scenario, according to an example implementation. In this scenario, vehicle 100 is turning right at a four-way intersection. In this case, process 1000 may determine that objects near the right front of vehicle 100 should be prioritized, since obstacles, if any, are most likely to appear at the right front of vehicle 100. Thus, process 1000 may prioritize cameras 120 with a field of view of the right front of vehicle 100. In particular, process 1000 may prioritize forward wide camera 120FW and right camera 120R over all other cameras 120 (e.g., 120FL, 120L, and 120RV), by assigning lossless or near-lossless image compression techniques to forward wide camera 120FW and right camera 120R, and assigning one or more lossy image compression techniques (e.g., a default image compression technique, such as JPEG level 50) to the other cameras 120.

Figure 12E:
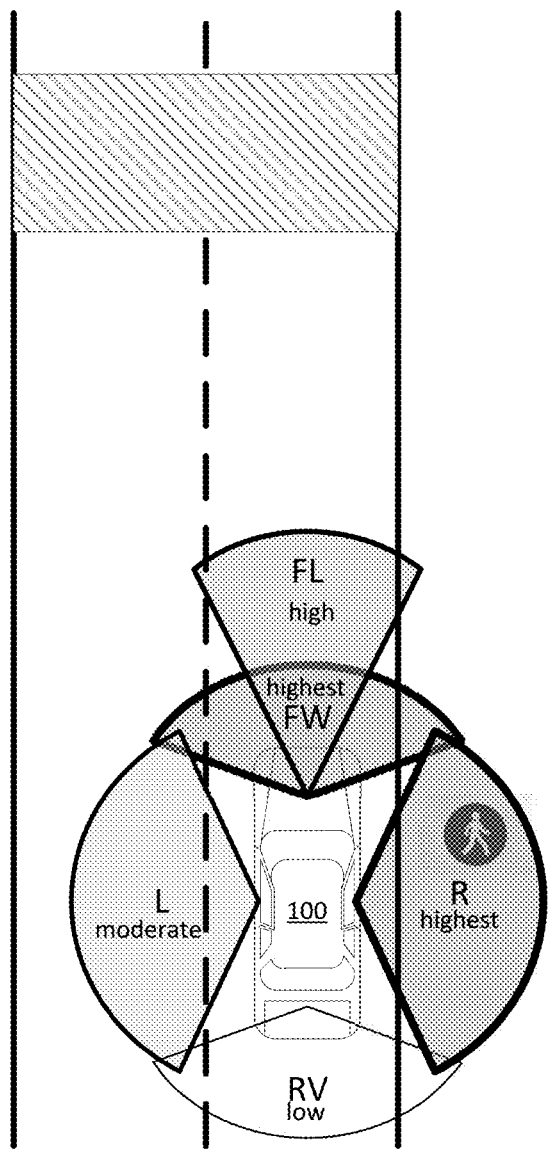

It should be understood that there may be two, three, or more levels of prioritization (e.g., two, three, or more tiers of information loss) in an ICT configuration. FIG. 12E illustrates an example driving scenario, according to an example implementation with three or more levels of prioritization. In this scenario, vehicle 100 is traveling straight along an urban road. An urban road may be characterized by a denser level of objects than a rural road or highway. In this case, process 1000 may determine that objects in front and to the right of vehicle 100 should be prioritized the most, since obstacles, if any, are most likely to appear at the front of vehicle 100 and traffic signs are likely to appear on the right of vehicle 100. Thus, process 1000 may prioritize cameras 120 with a field of view of the front and right of vehicle 100. In particular, process 1000 may prioritize forward wide camera 120FW and right camera 120R over all other cameras 120 (e.g., 120FL, 120L, and 120RV), by assigning lossless image compression techniques to forward wide camera 120FW and right camera 120R and assigning one or more lossy image compression techniques to the other cameras 120. In addition, to aid in the detection of upcoming objects (e.g., pedestrians, traffic lights, etc.), process 1000 may prioritize forward long camera 120FL over one or more other cameras (e.g., 120L and 120RV), by assigning an image compression technique with less information loss (e.g., level 80) to forward long camera 120FL than to left camera 120L and rearview camera 120RV. Notably, the image compression technique assigned to forward long camera 120FL does not need to be lossless, since vehicle 100 will generally be traveling at a slower speed in the urban context, and because forward wide camera 120FW has been assigned a lossless image compression technique, and therefore, can be used for most obstacle detection. Because there is a moderate likelihood that obstacles may appear on the left side of vehicle 100, subprocess 1040 may prioritize left camera 120L over rearview camera 120RV, by assigning an image compression technique with less information loss (e.g., level 70) to left camera 120L than to rearview camera 120RV (e.g., level 50).

Figure 12F:
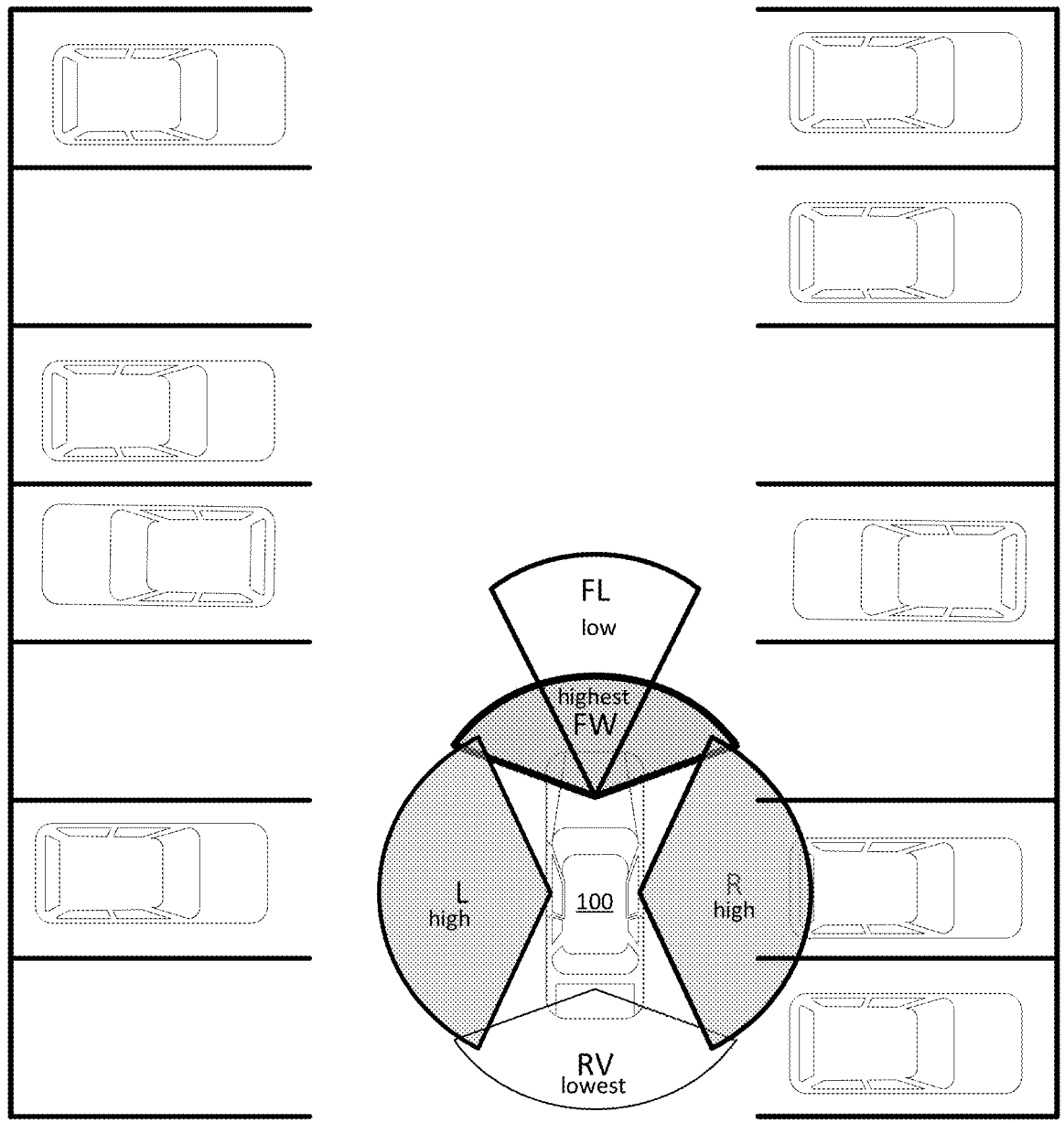

FIG. 12F illustrates an example driving scenario, according to an example implementation with three or more levels of prioritization. In this scenario, vehicle 100 is traveling through a parking lot. In this case, process 1000 may determine that objects in the near front and both sides of vehicle 100 should be prioritized, since these objects are the most likely to present obstacles. Thus, process 1000 may prioritize cameras 120 with a field of view of the near front and sides of vehicle 100. In particular, process 1000 may prioritize forward wide camera 120FW, right camera 120R, and left camera 120L over all other cameras (e.g., 120FL and 120RV). In addition, forward wide camera 120FW may be prioritized over right camera 120R and left camera 120L, and forward long camera 120FL may be prioritized over rearview camera 120RV. For example, forward wide camera 120FW may be assigned a lossless image compression technique, right camera 120R and left camera 120L may be assigned a lossy level 90 image compression technique, forward long camera 120FL may be assigned a lossy level 50 image compression technique, and rearview camera 120RV may be assigned a lossy level 30 image compression technique.

Object recognition may be performed on images from cameras 120 in a distributed or centralized manner. In both implementations, artificial intelligence, such as deep neural networks, may be utilized for the object detection performed by perception module 410. Deep neural networks are inspired by the connectivity patterns between neurons of the human visual cortex. Deep neural networks are trained (e.g., using annotated or labeled datasets) to adjust internal weight values and activation functions. Once the deep neural network has been trained and validated, the deep neural network may be deployed for object recognition. It should be understood that, even after deployment, the deep neural network may continue to be trained and updated using new datasets to improve its performance in object recognition. A conventional rule-based algorithm could be used in addition to or as an alternative to a deep neural network. In a particular implementation, a conventional rule-based algorithm is used in combination with a deep neural network to achieve redundancy and improve reliability of object recognition.

The architecture of DNN object detectors follows a Lego-like construction pattern, based on chaining different building blocks together. The first part of object detection in a deep neural network is a feature extractor, referred to as the "backbone network." The deep neural network draws its discriminative power from the backbone network. Actual tasks, such as segmentation and object recognition, are performed on top of the feature maps extracted by the backbone network.

Figure 13:
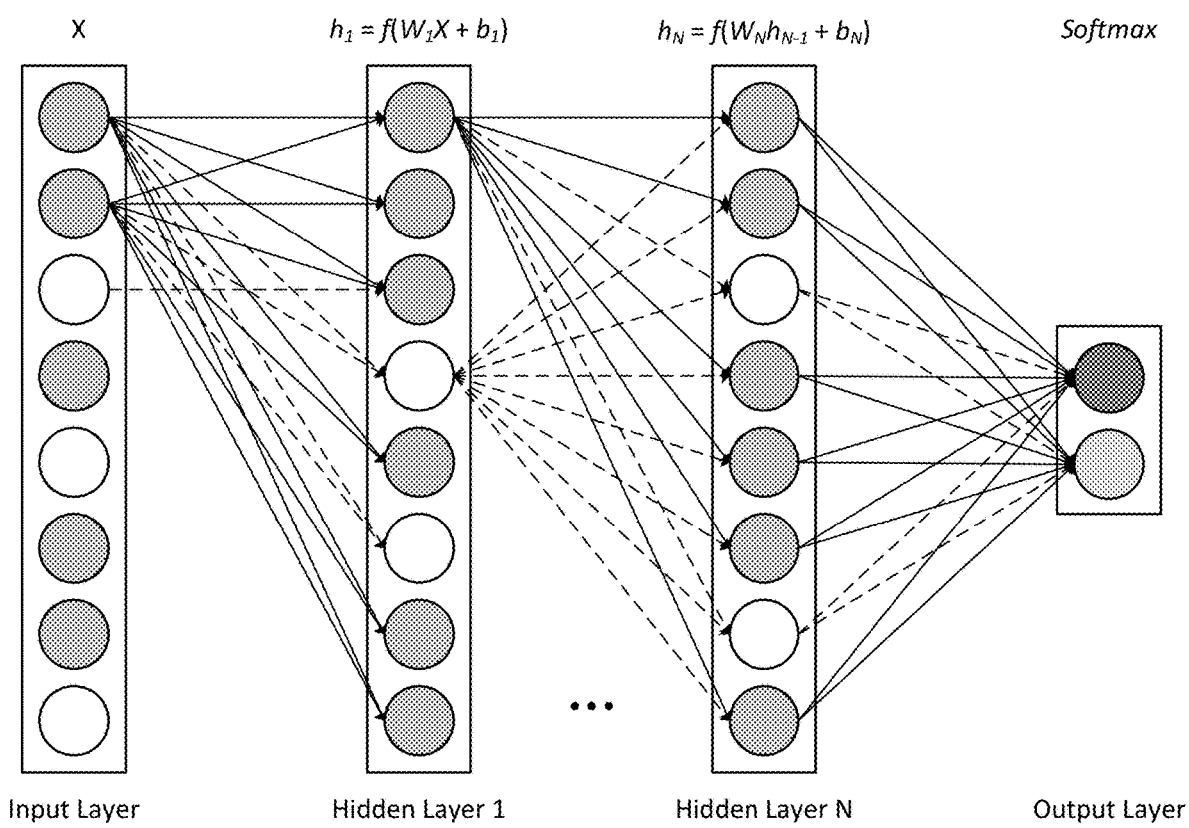
FIG. 13 illustrates a deep neural network, according to an example implementation.

FIG. 13 illustrates a deep neural network, according to an example implementation. The deep neural network comprises a plurality of layers. Each layer comprises a varied number of non-linear computing elements, referred to as "neurons." The number of layers and the number of neurons in each layer are parameters that enable a deep neural network to be highly customizable. The combination of these parameters determines the processing speed and accuracy of the deep neural network. The deep neural network may comprise an input layer, one or more hidden layers, and an output layer. The output of the deep neural network may comprise a classification of an object into one of a plurality of possible classifications or a probability vector representing, for each of the plurality of possible classifications, the probability or confidence that the object belongs to that class (e.g., with all values in the vector summing to one).

A change in the image compression technique used for images input to a deep neural network may affect the accuracy of the deep neural network's object recognition. For example, a lossy image compression technique with 90% image quality can result, approximately, in a 3% reduction in the accuracy of the deep neural network, relative to a lossless image compression technique. A lossy image compression technique with 10% image quality can result, approximately, in a 60% reduction in the accuracy of the deep neural network, relative to a lossless image compression technique.

There is also a tradeoff between accuracy and processing speed for deep neural networks. For example, a fast deep neural network, such as certain convolutional neural networks, can process a standard image within 164 milliseconds, but with an accuracy of only 55%. In contrast, a slower deep neural network may require 440 milliseconds to process the same standard image, but with an accuracy of 89%. More generally, it should be understood that a first model (e.g., machine-learning model, such as a neural network, or other AI or rules-based model) for object recognition, $OR_1$, may be slower or otherwise more computationally expensive than a second model (e.g., machine-learning model, such as a neural network, or other AI or rules-based model) for object recognition, $OR_2$, but more accurate than $OR_2$. Conversely, $OR_2$ is faster or otherwise less computationally expensive than $OR_1$, but less accurate than $OR_1$.

Figure 14A:
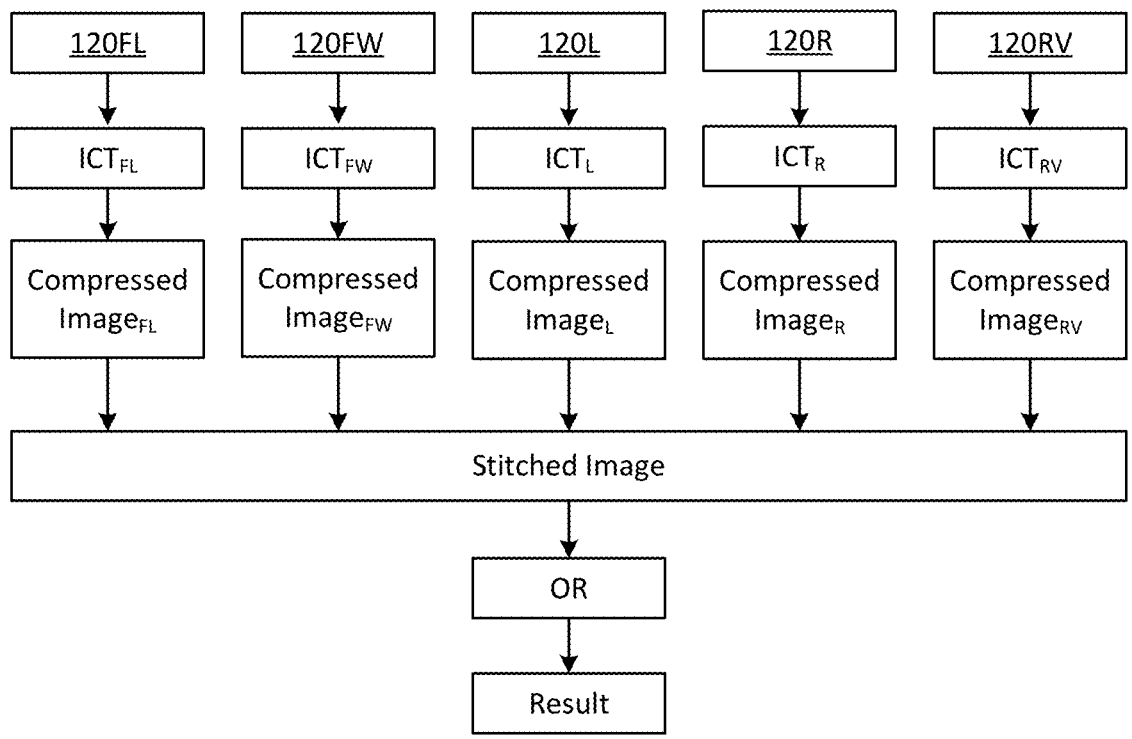
FIGS. 14A and 14B illustrate centralized and distributed object recognition, respectively, according to example implementations.

FIG. 14A illustrates centralized object recognition, according to an example implementation. In centralized object recognition, images from each camera 120 are compressed according to the image compression technique assigned to that camera 120. The compressed images are stitched together, and the stitched image is then input into a single object-recognition (OR) model (e.g., a deep neural network or rules-based algorithm). In order to stitch the images together, the inputs must be synchronized across the image streams from all of cameras 120 to achieve 360-degree environmental perception. Stitching generally involves using feature detection to find distinct features that match across two or more of the images from separate cameras 120, and using those matching features to correct the images in terms of scaling, rotation, and the like, and blending all of the images together into a single panoramic image. Notably, since the stitching is performed after the image compression, the stitched image will have regions of differing compression levels, representing different regional priorities. The output of the object-recognition model is the final result, representing the recognition of zero, one, or a plurality of objects from the stitched image.

Figure 14B:
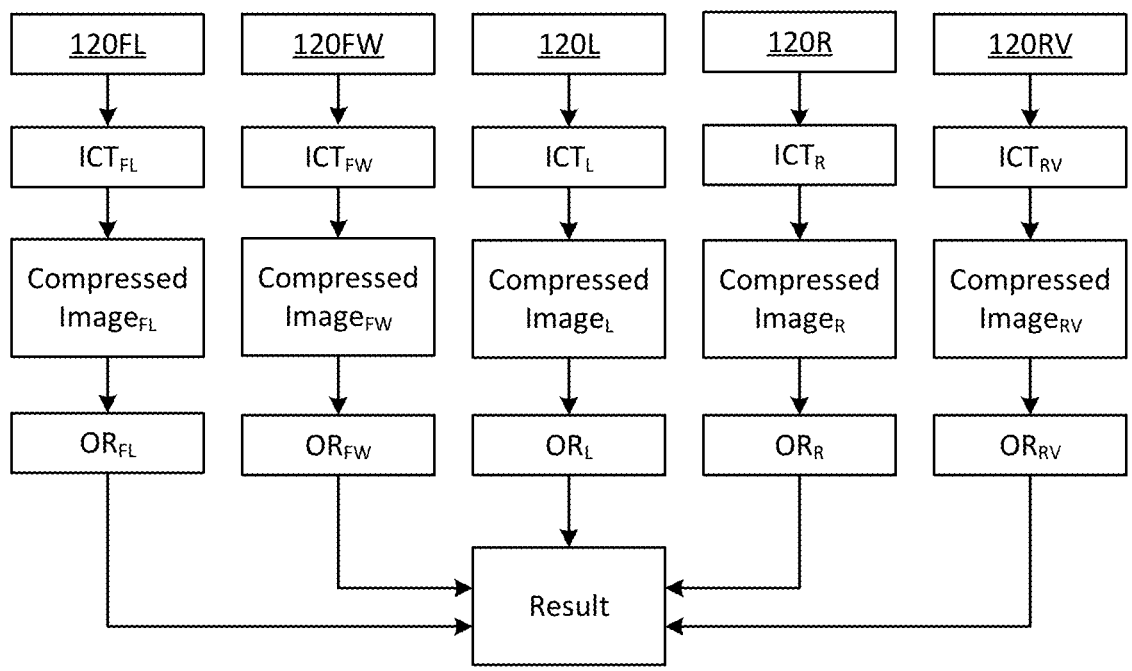

FIG. 14B illustrates distributed object recognition, according to an example implementation. As in centralized object recognition, in distributed object recognition, images from each camera 120 are compressed according to the image compression technique assigned to that camera 120. However, each compressed image is then input into a separate object recognition (OR) model (e.g., a deep neural network or rules-based algorithm) that is assigned to the camera 120 from which the image was acquired. The outputs of all of the object-recognition models are then combined into a final result, representing the recognition of zero, one, or a plurality of objects from the compressed images. In order to combine the outputs of the object-recognition models, the outputs must be synchronized across the image streams from all of cameras 120 to achieve 360-degree environmental perception.

In an implementation in which perception module 420 utilizes distributed object recognition, the object-recognition model (e.g., a deep neural network or rules-based algorithm) used for recognizing objects in the image streams from each camera 120 may also be selected and assigned based on one or more features. The assignment of the object-recognition model to be used for each camera 120 may be performed in a similar or identical manner as the assignment of the image compression technique to be used for each camera 120. For example, process 1000 (e.g., as implemented by the ICT configuration sub-module of prescriptive analytics module 630, or by preprocessing module 112) may comprise the selection of an OR configuration in addition to or instead of the selection of an ICT configuration. It should be understood that the OR configuration may comprise an assignment of an object-recognition model (e.g., a deep neural network or rules-based algorithm) to each camera 120.

In general, a more accurate object-recognition model (e.g., ORO may be assigned to a camera 120 with a higher priority, just as a higher quality image compression technique (e.g., lossless or near-lossless) is assigned to a camera 120 with a higher priority. Conversely, a less accurate object-recognition model (e.g., $OR_2$) may be assigned to a camera 120 with a lower priority, just as a lower quality image compression technique (e.g., lossy) is assigned to a camera 120 with a lower priority. Thus, cameras 120 which are positioned with a field of view that is more likely to contain objects of interest may be assigned an object-recognition model that is more likely to accurately classify those objects. Conversely, cameras 120 which are positioned with a field of view that is less likely to capture objects of interest may be assigned an object-recognition model that has less accuracy but a faster processing speed, in order to save computational resources (e.g., on ECU 110).

It should be understood that the assignment of an object-recognition model to camera 120 may be independent from the assignment of the image compression technique to the same camera 120. In particular, the assignment of the object-recognition models may utilize different features and may be implemented by a different lookup table, decision tree, and/or other mechanism. Thus, in some cases, the object-recognition model assigned to a camera 120 may not be upgraded, even if the image compression technique assigned to that camera 120 is upgraded due an increase in priority of the camera 120, and vice versa. Alternatively, the ICT configurations and OR configurations may be combined, such that a single retrieval from the same lookup table, a single traversal of the same decision tree, or a single operation on some other mechanism produces both the ICT configuration and the OR configuration.

Figure 15A:
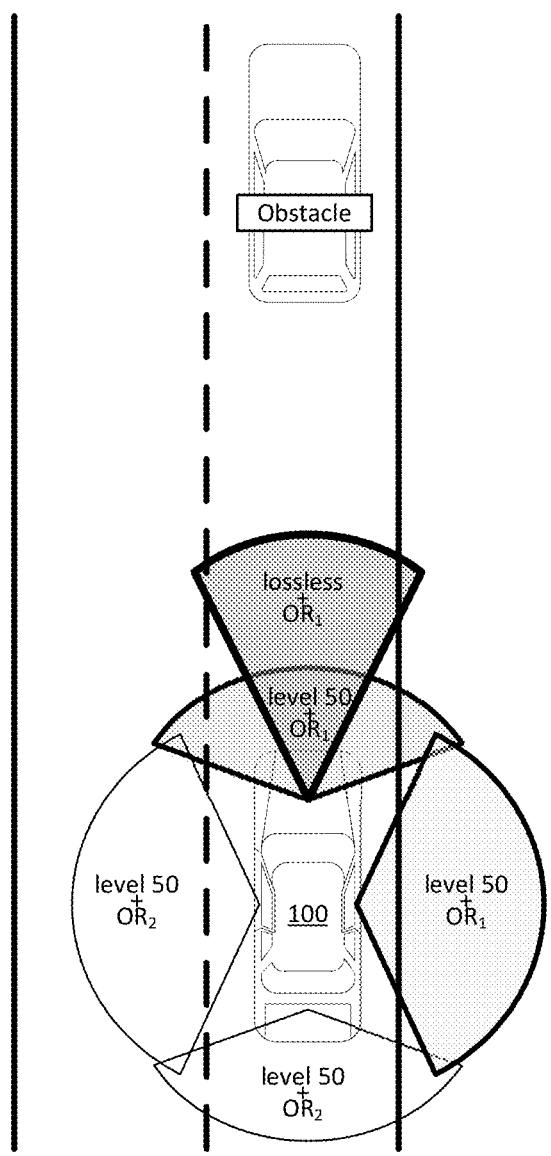
FIGS. 15A and 15B illustrate example driving scenarios, according to example implementations.

FIG. 15A illustrates an example driving scenario, according to an example implementation which adjusts both an ICT configuration and an OR configuration based on the individual priorities of cameras 120 in vehicle 100. As illustrated, an obstacle has been detected in the images from forward long camera 120FL. Thus, forward long camera 120FL has been elevated to the highest priority in terms of both image compression technique (e.g., lossless) and object-recognition model (e.g., OR$_1$). Forward wide camera 120FW and right camera 120R have moderate priority due to the need to detect near, front obstacles and traffic signs. Thus, forward wide camera 120FW and right camera 120R have been assigned an object-recognition model (e.g., OR$_1$) with high accuracy. However, forward wide camera 120FW and right camera 120R have been assigned the default image compression technique (e.g., JPEG level 50) until an object of interest is detected within their fields of view. The fields of view of left camera 120L and rearview camera 120RV are the least likely to contain objects of interest, and therefore, left camera 120L and rearview camera 120RV have been assigned the lowest priority in terms of both image compression technique (e.g., JPEG level 50) and object-recognition model (e.g., OR$_2$).

Figure 15B:
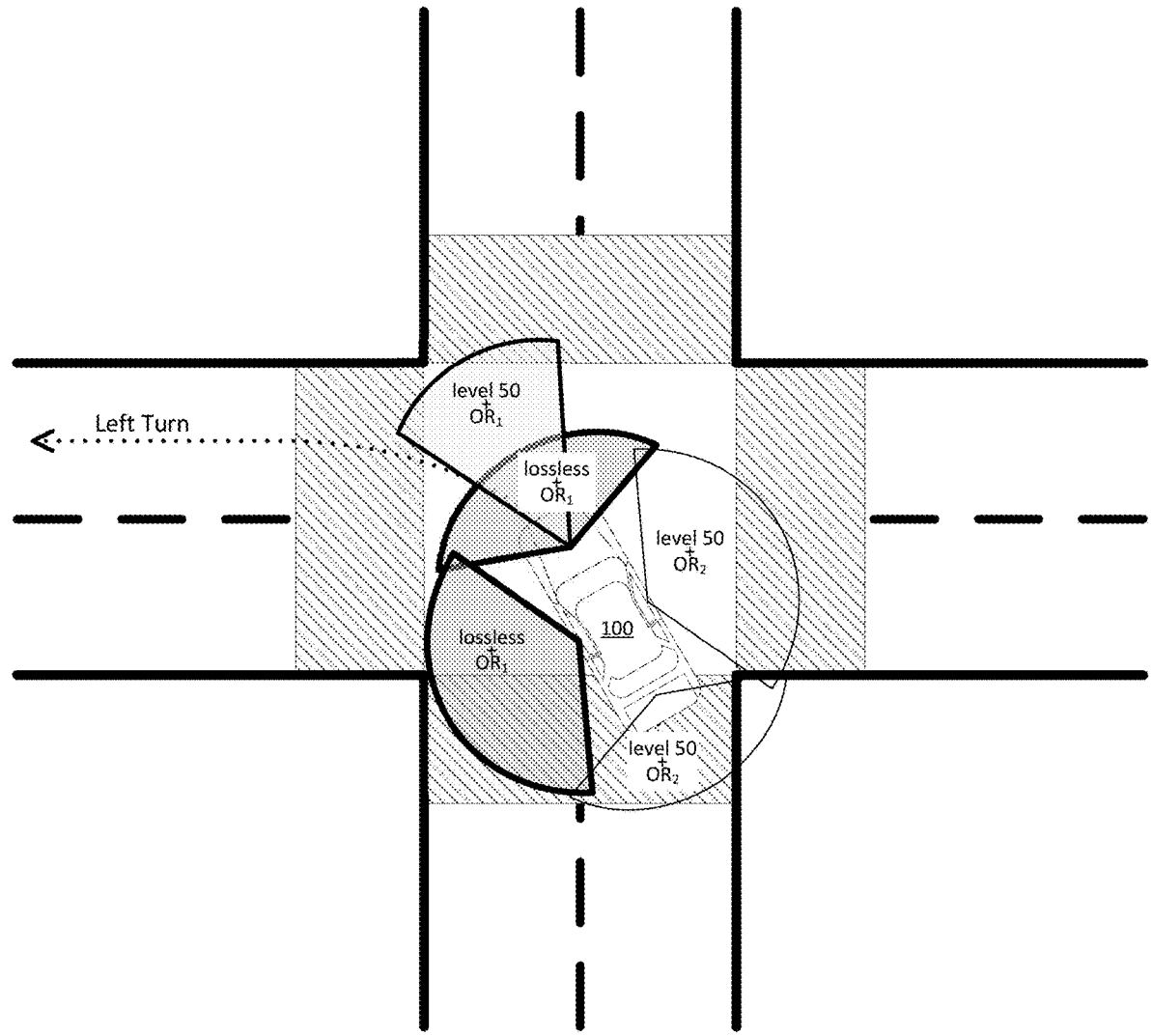

FIG. 15B illustrates another example driving scenario, according to an example implementation which adjusts both an ICT configuration and an OR configuration based on the individual priorities of cameras 120 in vehicle 100. As illustrated, vehicle 100 is turning left. Thus, forward wide camera 120FW and left camera 120L have been elevated to the highest priority in terms of both image compression technique (e.g., lossless) and object-recognition model (e.g., OR$_1$). Forward long camera 120FL has moderate priority due to a moderate likelihood of objects of interest entering its field of view. Thus, forward long camera 120FL has been assigned an object-recognition model (e.g., OR$_1$) with high accuracy. However, forward long camera 120FL has been assigned the default image compression technique (e.g., JPEG level 50) until an object of interest is detected within its field of view. The fields of view of right camera 120R and rearview camera 120RV are the least likely to contain objects of interest, and therefore, right camera 120R and rearview camera 120RV have been assigned the lowest priority in terms of both image compression technique (e.g., JPEG level 50) and object-recognition model (e.g., OR$_2$).

As described above, dynamic image compression and/or dynamic DNN selection may be used to reduce the utilization of computational resources, for example, in an ECU 100 of an autonomous vehicle 100. Advantageously, embodiments can be used to ensure that image-compression tasks do not overwhelm available computational resources. This frees up the computation resources to ensure that critical AD or ADAS tasks, such as path planning and vehicle control, do not experience deterioration.

Embodiments may consist of one implementation described herein or may comprise any combination of two or more of the implementations described herein. It should be understood that the implementations described herein may be applied to types of data, other than images from cameras 120, such as other types of data output by other types of sensors. In addition, although the implementations are described with respect to a vehicle 100, it should be understood that the disclosed implementations may be applied to any type of moving object with some level of autonomous capability, such as a drone. Furthermore, although deep neural networks are primarily described as the models that are assigned to cameras 120 for object recognition, other types of models used for object recognition may be used in place of deep neural networks, including any type of AI model (e.g., other types of neural networks or machine-learning algorithms) or rules-based model. Any such model may be substituted in place of deep neural networks in any of the disclosed implementations.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A system for dynamically assigning image compression techniques to a plurality of cameras in a vehicle, wherein the system comprises at least one hardware processor that:
   receives a plurality of features, wherein each of the plurality of features is a feature of the vehicle or a feature of an environment of the vehicle;
   prioritizes each of the cameras within the plurality of cameras based on the plurality of features; and
   assigns one of a plurality of available image compression techniques to each of the plurality of cameras based on the prioritizations, such that an image compression technique assigned to a camera with higher priority has less information loss than an image compression technique that is assigned to a camera with lower priority,
   wherein the plurality of features comprises a road type, wherein the plurality of cameras comprises a forward long camera and a forward wide camera, wherein the forward long camera has a longer and narrower field of view than the forward wide camera, and wherein prioritizing each of the cameras comprises:
   when the road type is a first road type from a plurality of possible road types, prioritizing the forward ling camera over the forward wide camera; and,
   when the road type is a second road type from the plurality of possible road types, prioritizing the forward wide camera over the forward long camera.

2. The system of claim 1, wherein the at least one hardware processor is located in a cloud system, wherein the plurality of features are received from the vehicle over at least one network, and wherein the at least one hardware processor further sends, to the vehicle over the at least one network, the assignments of the plurality of available image compression techniques to the plurality of cameras.

3. The system of claim 1, wherein the at least one hardware processor is located in the vehicle, and wherein the at least one hardware processor further compresses images from each of the plurality of cameras, based on the one of the plurality of available image compression techniques assigned to that camera, prior to object recognition being performed on the images.

4. The system of claim 3, wherein the at least one hardware processor is located in an electronic control unit (ECU) of the vehicle.

5. The system of claim 4, wherein the at least one hardware processor further applies an object-recognition model to the compressed images to recognize objects in the images.

6. The system of claim 1, wherein the plurality of features comprises a direction of travel of the vehicle, and wherein prioritizing each of the cameras comprises increasing a priority of one or more of the plurality of cameras that have a field of view in the direction of travel, relative to a priority of one or more of the plurality of cameras that do not have a field of view in the direction of travel.

7. The system of claim 6, wherein the plurality of cameras further comprises a front-facing camera, a right-facing camera, a left-facing camera, and a rear-facing camera, and prioritizing each of the cameras comprises, when the direction of travel is straight, prioritizing the front-facing camera and the right-facing camera over the left-facing camera and the rear-facing camera.

8. The system of claim 1, wherein the plurality of features comprises a detected object of interest, and wherein prioritizing each of the cameras comprises increasing a priority of one or more of the plurality of cameras that have a field of view of the detected object of interest, relative to a priority of one or more of the plurality of cameras that do not have a field of view of the detected object of interest.

9. The system of claim 1, wherein the plurality of features comprises detected objects of a plurality of prioritized classes, wherein prioritizing each of the cameras comprises, when a first object of a first class of the plurality of prioritized classes is detected in an image from a first camera of the plurality of cameras while a second object of a second class of the plurality of prioritized classes is detected in an image from a second camera of the plurality of cameras and the second class is prioritized over the first class, increasing a priority of the second camera relative to the first camera.

10. The system of claim 1, wherein the plurality of features comprises computational loads on processor cores that process images from each of the plurality of cameras, and wherein prioritizing each of the cameras comprises decreasing a prioritization of a camera whose images are being processed by a processor core with a computational load that exceeds a threshold.

11. The system of claim 1, wherein the plurality of features comprises route information, and wherein receiving the plurality of features comprises:
determining a current location of the vehicle;
determining a route segment corresponding to the current location of the vehicle; and
retrieving the route information associated with the route segment.

12. The system of claim 1, wherein the at least one hardware processor further determines a field of view for each of the plurality of cameras based on one or more of the plurality of features.

13. The system of claim 1, wherein the at least one hardware processor further assigns one of a plurality of available object-recognition models to each of the plurality of cameras based on the prioritizations.

14. The system of claim 13, wherein the plurality of available object-recognition models comprises a plurality of types of one or both of deep neural networks or rule-based algorithms.

15. The system of claim 13, wherein the plurality of available object-recognition models comprises a first object-recognition model and a second object-recognition model, wherein the first object-recognition model has greater accuracy than the second object-recognition model, and wherein the first object-recognition model requires greater computational resources than the second object-recognition model.

16. The system of claim 1, wherein the prioritization comprises at least three levels of priority.

17. The system of claim 1, wherein the plurality of available image compression techniques comprise at least one lossless image compression technique and two or more lossy image compression techniques.

18. A method comprising using at least one hardware processor to:
receive a plurality of features, wherein each of the plurality of features is a feature of a vehicle or a feature of an environment of the vehicle;
prioritize each of a plurality of cameras in the vehicle based on the plurality of features; and
assign one of a plurality of available image compression techniques to each of the plurality of cameras based on the prioritizations, such that an image compression technique assigned to a camera with higher priority has less information loss than an image compression technique that is assigned to a camera with lower priority,
wherein the plurality of features comprises a road type, wherein the plurality of cameras comprises a forward long camera and a forward wide camera, wherein the forward long camera has a longer and narrower field of view than the forward wide camera, and wherein prioritizing each of the cameras comprises:
when the road type is a first road type from a plurality of possible road types, prioritizing the forward ling camera over the forward wide camera; and,
when the road type is a second road type from the plurality of possible road types, prioritizing the forward wide camera over the forward long camera.

19. A non-transitory computer-readable medium having instructions stored therein, wherein the instructions, when executed by a processor, cause the processor to:
receive a plurality of features, wherein each of the plurality of features is a feature of a vehicle or a feature of an environment of the vehicle;
prioritize each of a plurality of cameras in the vehicle based on the plurality of features; and
assign one of a plurality of available image compression techniques to each of the plurality of cameras based on the prioritizations, such that an image compression technique assigned to a camera with higher priority has less information loss than an image compression technique that is assigned to a camera with lower priority,
wherein the plurality of features comprises a road type, wherein the plurality of cameras comprises a forward long camera and a forward wide camera, wherein the forward long camera has a longer and narrower field of view than the forward wide camera, and wherein prioritizing each of the cameras comprises:

when the road type is a first road type from a plurality of possible road types, prioritizing the forward ling camera over the forward wide camera; and, when the road type is a second road type from the plurality of possible road types, prioritizing the forward wide camera over the forward long camera.

\* \* \* \* \*